US011117833B2

(12) United States Patent
Kamitani et al.

(10) Patent No.: US 11,117,833 B2
(45) Date of Patent: *Sep. 14, 2021

(54) RAPID-HARDENING MORTAR COMPOSITION

(71) Applicant: MITSUBISHI MATERIALS CORPORATION, Chiyoda-ku (JP)

(72) Inventors: Kiyoshi Kamitani, Chichibu-gun (JP); Daisuke Kimoto, Chichibu-gun (JP); Kenji Tokunaga, Tokyo (JP); Hideo Tawara, Tokyo (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 477 days.

This patent is subject to a terminal disclaimer.

(21) Appl. No.: 16/078,652

(22) PCT Filed: Mar. 31, 2017

(86) PCT No.: PCT/JP2017/013613
§ 371 (c)(1),
(2) Date: Aug. 22, 2018

(87) PCT Pub. No.: WO2017/171009
PCT Pub. Date: Oct. 5, 2017

(65) Prior Publication Data
US 2020/0317576 A1    Oct. 8, 2020

(30) Foreign Application Priority Data

Mar. 31, 2016 (JP) .............................. JP2016-073198
Mar. 31, 2016 (JP) .............................. JP2016-073416
Mar. 27, 2017 (JP) .............................. JP2017-061311

(51) Int. Cl.
| | |
|---|---|
| C04B 28/06 | (2006.01) |
| C04B 16/06 | (2006.01) |
| C04B 18/14 | (2006.01) |
| C04B 22/14 | (2006.01) |
| C04B 24/04 | (2006.01) |
| C04B 40/00 | (2006.01) |
| C04B 103/14 | (2006.01) |
| C04B 103/46 | (2006.01) |
| C04B 103/60 | (2006.01) |
| C04B 111/00 | (2006.01) |
| C04B 111/72 | (2006.01) |

(52) U.S. Cl.
CPC .......... *C04B 28/06* (2013.01); *C04B 16/0641* (2013.01); *C04B 18/146* (2013.01); *C04B 22/147* (2013.01); *C04B 24/04* (2013.01); *C04B 40/0042* (2013.01); *C04B 2103/14* (2013.01); *C04B 2103/465* (2013.01); *C04B 2103/601* (2013.01); *C04B 2111/0075* (2013.01); *C04B 2111/00137* (2013.01); *C04B 2111/72* (2013.01)

(58) Field of Classification Search
CPC . C04B 16/0641; C04B 18/146; C04B 22/147; C04B 24/04; C04B 28/06; C04B 40/0042; C04B 2103/14; C04B 2103/465; C04B 2103/601; C04B 2111/00137; C04B 2111/0075; C04B 2111/72; C04B 7/32; C04B 16/06; C04B 20/008; C04B 22/0093; C04B 22/085; C04B 22/10; C04B 22/143; C04B 24/045; C04B 24/2623; C04B 24/2641; C04B 28/04; C04B 40/0039; C04B 2103/44; C04B 2111/70; E01C 7/10; Y02W 30/91
See application file for complete search history.

(56) References Cited

U.S. PATENT DOCUMENTS 3,215,548 A * 11/1965 Vollick .................... C04B 28/02
                                                                106/725
8,950,928 B2    2/2015 Nakashima et al.
10,800,701 B2 * 10/2020 Kamitani .............. C04B 14/303

FOREIGN PATENT DOCUMENTS

| CN | 1771210 A | 5/2006 |
|---|---|---|
| CN | 101041569 A | 9/2007 |
| CN | 101258115 A | 9/2008 |
| CN | 101928120 A | 12/2010 |
| CN | 103253901 A | 8/2013 |
| CN | 103408273 A | 11/2013 |
| CN | 103771809 A | 5/2014 |

(Continued)

OTHER PUBLICATIONS

International Search Report dated Jun. 27, 2017 in PCT/JP2017/013613 filed Mar. 31, 2017.

(Continued)

*Primary Examiner* — Anthony J Green
(74) *Attorney, Agent, or Firm* — Oblon, McClelland, Maier & Neustadt, L.L.P.

(57) ABSTRACT

This rapid-hardening mortar composition includes: a rapid-hardening admixture; cement; and a fine aggregate, wherein the cement is contained in an amount of 100 parts by mass to 2,000 parts by mass with respect to 100 parts by mass of the rapid-hardening admixture, the rapid-hardening admixture is a composition that contains: calcium aluminate; inorganic sulfate in an amount of 50 parts by mass to 200 parts by mass with respect to 100 parts by mass of the calcium aluminate; and a setting modifier in an amount of 0.1 parts by mass to 10 parts by mass with respect to 100 parts by mass of the calcium aluminate, and an average particle diameter of the calcium aluminate is in a range of 8 μm to 100 μm, and an average particle diameter of the setting modifier is in a range of 5 μm or less.

20 Claims, 2 Drawing Sheets

(56) References Cited

FOREIGN PATENT DOCUMENTS

| | | |
|---|---|---|
| CN | 103922633 A | 7/2014 |
| CN | 105246853 A | 1/2016 |
| JP | 3-41420 B2 | 6/1991 |
| JP | 7-215751 A | 8/1995 |
| JP | 8-310846 A | 11/1996 |
| JP | 2000-281410 A | 10/2000 |
| JP | 2008-281410 A | 10/2000 |
| JP | 2007-238369 A | 9/2007 |
| JP | 2007-320835 A | 12/2007 |
| JP | 2008-273762 A | 11/2008 |
| JP | 2008-274580 A | 11/2008 |
| JP | 2012-121763 A | 6/2012 |
| JP | 2014-111516 A | 6/2014 |
| JP | 2014-181165 A | 9/2014 |
| JP | 2015-120624 A | 7/2015 |
| WO | WO 93/08135 A1 | 4/1993 |

OTHER PUBLICATIONS

International Search Report dated Jun. 27, 2017 in PCT/JP2017/013555 filed Mar. 31, 2017.
Office Action dated Mar. 10, 2020 in co-pending U.S. Appl. No. 16/084,755, 6 pages.
Combined Chinese Office Action and Search Report dated Jul. 17, 2020, in Patent Application No. 201780009812.4 (with English translation), 27 pages.
Edited by Zhang Yuzhen, "Production and Application of China Aluminate Cement" Beijing: China Building Materials Industrial Press, Jan. 2014, pp. 193-194.
Shuai Changhong, Editor in chief, "Practical Manual for Safety Operation Procedures and Troubleshooting of Construction Machinery" Beijing: Earthquake Publishing House, Mar. 2003, pp. 1517-1518.
Korean Notice of Allowance dated Jul. 21, 2021, in Korean Patent Application No. 10-2018-7022471 (with English Translation).

* cited by examiner

RAPID-HARDENING MORTAR COMPOSITION

TECHNICAL FIELD

The present invention relates to a rapid-hardening mortar composition, in particular, a rapid-hardening mortar composition useful as a patching repair material and an injection grout for pavement.

The present application claims priority on Japanese Patent Application No. 2016-73198 filed on Mar. 31, 2016, Japanese Patent Application No. 2016-73416 filed on Mar. 31, 2016, and Japanese Patent Application No. 2017-61311 filed on Mar. 27, 2017, the contents of which are incorporated herein by reference.

BACKGROUND ART

As a construction method of repairing a concrete structure deteriorated due to various causes, a patching repair method is widely known. The patching repair method is a construction method of removing a deteriorated part of concrete by chipping or the like and restoring the removed cross-sectional part with a patching repair material. As the patching repair material used in this construction method, a mortar composition containing cement and a fine aggregate is used. Depending on an embodiment of the patching repair method, a patching repair material for a plastering method, a patching repair material for a spraying method, a patching repair material for a filling method, or a patching repair material for a prepacking method is used. On the other hand, as a patching repair material to be used in an urgent (time-critical) repair work, in order to shorten a working period, a rapid-hardening mortar composition containing a rapid-hardening admixture for hardening a mortar composition at an early stage has also been used.

Further, as methods for constructing pavements of roads, port facilities, airport runways, and the like, a PC pavement and a RC pavement are known. The PC pavement is a pavement in which prestressed concrete (PC) pavement boards are disposed on a roadbed and a back-filling grout material is injected into a gap between the PC pavement boards and the roadbed. The RC pavement is a pavement in which a reinforced concrete (RC) pavement board is used in place of the PC pavement board. Furthermore, as a pavement for heavy traffic roads, a semi-flexible pavement is known. The semi-flexible pavement is a pavement in which cement milk is injected into an open-graded asphalt mixture having a large porosity. As an injection grout for pavement which is used as a raw material for a back-filling grout material used for the PC pavement and the RC pavement, cement milk used for the semi-flexible pavement, and the like, a mortar composition containing cement and a fine aggregate is also used. The mortar composition to be used as the injection grout for pavement is usually a rapid-hardening mortar composition in which a rapid-hardening admixture is contained to harden the cement at an early stage so that work is done at night and a road is opened to traffic next morning.

As the rapid-hardening admixture of the rapid-hardening mortar composition, an admixture in which calcium aluminate and inorganic sulfate are combined (blended) is known. However, there have been problems that this rapid-hardening admixture in which calcium aluminate and inorganic sulfate are combined has a strong action of accelerating hardening of the mortar composition, and, in the mortar composition containing this rapid-hardening admixture, a time (setting initial time) from addition of water until the mortar composition starts to set is short so that sufficient pot life cannot be secured. For this reason, in a rapid-hardening admixture in which calcium aluminate and inorganic sulfate are combined, a setting modifier is added so as to regulate (control) the setting initial time of the mortar composition. As the setting modifier, inorganic carbonate, oxycarboxylic acid, or sodium aluminate is used.

Patent Document 1 discloses an ultra-rapid-hardening cement composition which contains a quick-hardening cement as a main component, and the quick-hardening cement contains 15 to 35% by weight of a quick-hardening component in which a weight ratio of calcium aluminate: inorganic sulfate is 1:0.5 to 3, and the ultra-rapid-hardening cement composition contains, in terms of internal proportion of weight, 0.2 to 3% of sodium aluminate, 0.2 to 5% of inorganic carbonate, and 0.1 to 2% of oxycarboxylic acids.

Patent Document 2 discloses a concrete patching repair material containing a rapid-hardening admixture, a cement mineral, an aggregate, a powdered emulsion, and fibers. This Patent Document 2 discloses that sodium aluminate, inorganic carbonate, and carboxylic acids are used as setting modifiers of the rapid-hardening admixture, and these setting modifiers have a particle size constitution including 10 to 45% by mass of first particles having an average particle diameter of greater than 45 μm and equal to or less than 90 μm, 30 to 70% by mass of second particles having an average particle diameter of greater than 90 μm and equal to or less than 150 μm, and 5 to 30% by mass of third particles having an average particle diameter of greater than 150 μm and equal to or less than 500 μm, in which the second particles are included in an amount which is larger than the amount of the first particles and also larger than the amount of the third particles.

Patent Document 3 discloses an injection grout for pavement which contains a rapid-hardening admixture, a cement mineral, sand, and a powdered emulsion. This Patent Document 3 discloses that sodium aluminate, inorganic carbonate, and carboxylic acids are used as setting modifiers of the rapid-hardening admixture, and these setting modifiers have a particle size constitution including 10 to 45% by mass of first particles having an average particle diameter of greater than 45 μm and equal to or less than 90 μm, 30 to 70% by mass of second particles having an average particle diameter of greater than 90 μm and equal to or less than 150 μm, and 5 to 30% by mass of third particles having an average particle diameter of greater than 150 μm and equal to or less than 500 μm, in which the second particles are included in an amount which is larger than the amount of the first particles and also larger than the amount of the third particles.

It is required that a rapid-hardening mortar composition containing a rapid-hardening admixture can stably and sufficiently secure a pot life, that is, a setting initial time is stable and long, and fluidity is high during a period from addition of water until hardening reaction proceeds. In addition, after completion of construction work, it is required that hardening occurs at an early stage and high strength (compression strength) is developed, that is, excellent properties of early age strength are exhibited.

However, in the ultra-rapid-hardening cement composition disclosed in Patent Document 1, there have been problems that it is difficult to secure a long pot life as long as 60 minutes without reducing a compression strength at an early age (about 3 hours of age), and spots are observed on a hardened body of the cement composition and these parts become defects, and thereby causing decrease in long-term strength. In addition, there was a problem that setting time greatly varies depending on an environmental temperature, and thereby resulting in poor workability at a construction site.

Further, in the concrete patching repair material disclosed in Patent Document 2 and the injection grout for pavement disclosed in Patent Document 3, by specifying a particle size constitution of the setting modifiers contained in the rapid-hardening admixture, the properties of early age strength and the environmental temperature dependencies of the setting time are improved. However, in the case where the concrete patching repair material and the injection grout for pavement in which such a rapid-hardening admixture is mixed are stored for about 3 months, the setting time may be greatly changed as compared with the setting time immediately after production and the properties of early age strength may be decreased.

PRIOR ART DOCUMENTS

Patent Documents

Patent Document 1: Japanese Examined Patent Application, Second Publication No. H3-41420
Patent Document 2: Japanese Unexamined Patent Application, First Publication No. 2008-273762
Patent Document 3: Japanese Unexamined Patent Application, First Publication No. 2008-274580

DISCLOSURE OF THE INVENTION

Problems to be Solved by the Invention

The present invention has been made in view of the above circumstances, and an object of the present invention is to provide a rapid-hardening mortar composition in which variations in setting initial time due to an environmental temperature are small, variations in setting initial time are small even in the case of being stored for a long period of time, fluidity is high during a period from addition of water until hardening reaction proceeds, and properties of early age strength are excellent.

Solutions for Solving the Problems

In order to solve the above problems, the present inventors have made intensive studies, and, as a result, they have found that it is effective to add a rapid-hardening admixture to predetermined amounts of cement and a fine aggregate, and the rapid-hardening admixture is a composition containing calcium aluminate, inorganic sulfate, and a setting modifier (for example, one or more of inorganic carbonates, oxycarboxylic acids, sodium aluminate, and sodium sulfate) at predetermined ratios, in which an average particle diameter of the calcium aluminate is in a range of 8 µm to 100 µm and an average particle diameter of the setting modifier is in a range of 5 µm or less. That is, for the rapid-hardening mortar composition containing predetermined amounts of the cement and the fine aggregate with respect to the above-mentioned rapid-hardening admixture, it has been found that variations in setting initial time due to an environmental temperature are even smaller, variations in setting initial time even in the case of being stored for a longer period are small, fluidity is high during a period from addition of water until hardening reaction proceeds, and properties of early age strength are excellent. In addition, it has been found that, by mixing and grinding a clinker consisting of calcium aluminate and a setting modifier, it is possible to obtain the calcium aluminate and the setting modifier having the above-mentioned average particle diameters.

The present invention has been made on the basis of the above findings, and a rapid-hardening mortar composition according to an aspect of the present invention includes: a rapid-hardening admixture; cement; and a fine aggregate, wherein rapid-hardening mortar composition includes the cement in an amount of 100 parts by mass to 2,000 parts by mass with respect to 100 parts by mass of the rapid-hardening admixture, the rapid-hardening admixture is a composition that contains: calcium aluminate; inorganic sulfate in an amount of 50 parts by mass to 200 parts by mass with respect to 100 parts by mass of the calcium aluminate; and a setting modifier in an amount of 0.1 parts by mass to 10 parts by mass with respect to 100 parts by mass of the calcium aluminate, and an average particle diameter of the calcium aluminate is in a range of 8 µm to 100 µm, and an average particle diameter of the setting modifier is in a range of 5 µm or less.

According to the rapid-hardening mortar composition of the aspect of the present invention, the setting modifier contained in the rapid-hardening admixture has an average particle diameter of 5 µm or less, which is fine as compared with calcium aluminate (average particle diameter of 8 µm to 100 µm), and thus the setting modifier is easily dissolved in water. Therefore, when water is added to the rapid-hardening mortar composition according to the aspect of the present invention, the setting modifier is rapidly dissolved in water in a stable manner over a wide temperature range, and a setting modifier action by the setting modifier is exerted at an early stage. Thus, variations in setting initial time due to an environmental temperature become small. In addition, since the setting modifier action by the setting modifier is exerted at an early stage, the setting initial time becomes stable and long, and fluidity after addition of water becomes high. Furthermore, after completion of the setting modifier action by the setting modifier, hardening acceleration action of cement is exerted by the calcium aluminate and the inorganic sulfate; and thereby, it is possible to improve properties of early age strength of the rapid-hardening mortar composition. Furthermore, the setting modifier is dispersed as fine particles in the rapid-hardening admixture. Thus, even in the case where the rapid-hardening mortar composition according to the aspect of the present invention is stored for a long period of time, it is unlikely that the setting modifier is segregated and an amount of the setting modifier becomes non-uniform. Therefore, even in the case of being stored for a long period of time, variations in setting time are small and properties of early age strength are excellent.

Herein, the rapid-hardening mortar composition according to the aspect of the present invention may contain the fine aggregate in an amount of 200 parts by mass to 1,000 parts by mass with respect to 100 parts by mass of the rapid-hardening admixture.

In this case, since the fine aggregate is contained in an amount in the above-mentioned range, properties of early age strength are excellent, and shrinkage (autogenerous shrinkage) of a hardened body due to hardening of the rapid-hardening mortar composition and shrinkage (drying shrinkage) due to dissipation of moisture after hardening are suppressed. Therefore, the occurrence of cracks in the hardened body can be suppressed, and strength of the hardened body is increased.

Accordingly, this rapid-hardening mortar composition is particularly useful as a patching repair material.

Further, the rapid-hardening mortar composition according to the aspect of the present invention may contain the fine aggregate in an amount of 10% by mass to 67% by mass with respect to the entire amount of the rapid-hardening mortar composition.

In this case, since the fine aggregate is contained in an amount in the above-mentioned range, properties of early age strength are excellent, and fluidity of the fine aggregate at the time of being added with water is improved. Even in fine (minute) spaces such as voids of an open-graded asphalt mixture in semi-flexible pavements, the fine aggregate becomes a medium. Thus, it is possible to satisfactorily fill the spaces.

Accordingly, this rapid-hardening mortar composition is particularly useful as an injection grout for pavement.

Further, in the rapid-hardening mortar composition according to the aspect of the present invention, it is preferable that the setting modifier contains one or more of inorganic carbonates, oxycarboxylic acids, sodium aluminate, and sodium sulfate.

In this case, the above-mentioned substance is easily dissolved in water. Thus, in the case where the setting modifier contains one or more of the above-mentioned substances, it is possible to reliably reduce variations in setting initial time of the rapid-hardening mortar composition due to an environmental temperature. In addition, since a setting modifier action by the setting modifier is exerted at an early stage, the setting initial time becomes more stable and longer, and fluidity after addition of water increases.

Furthermore, in the rapid-hardening mortar composition according to the aspect of the present invention, the setting modifier may be further added so that an amount of the setting modifier with respect to the entire amount of the rapid-hardening mortar composition is in a range of 0.01% by mass to 5% by mass.

In this case, since the amount of the setting modifier with respect to the entire amount of the rapid-hardening mortar composition is in a range of 0.01% by mass to 5% by mass, variations in setting initial time of the rapid-hardening mortar composition due to an environmental temperature and a long-term storage can be reliably reduced, and properties of early age strength are increased.

With regard to the setting modifier added to the rapid-hardening mortar composition, it is preferable that the setting modifier is added as a highly concentrated-setting modifier-containing mixture, and the highly concentrated-setting modifier-containing mixture contains an inorganic powder and the setting modifier in an amount of 50 parts by mass to 300 parts by mass with respect to 100 parts by mass of the inorganic powder.

In this case, by adding the setting modifier as the highly concentrated-setting modifier-containing mixture, it is possible to uniformly disperse the setting modifier in the rapid-hardening mortar composition, and to more reliably reduce variations in setting initial time of the rapid-hardening mortar composition due to an environmental temperature and a long-term storage.

Further, the rapid-hardening mortar composition according to the aspect of the present invention may further contain short fibers that consist of one or more of organic short fibers and carbon short fibers, in an amount of 0.1% by mass to 0.3% by mass with respect to the entire amount of the rapid-hardening mortar composition.

In this case, since the short fibers act as a reinforcing material, a hardened body obtained by hardening the rapid-hardening mortar composition has improved cracking resistance and excellent durability against fatigue.

Further, the rapid-hardening mortar composition according to the aspect of the present invention may further contain a powdered emulsion in an amount of 0.5% by mass to 30% by mass with respect to the entire amount of the rapid-hardening mortar composition.

In this case, since the rapid-hardening mortar composition contains the powdered emulsion, adhesion to a concrete structure is improved.

Further, the rapid-hardening mortar composition according to the aspect of the present invention may further contain silica fume in an amount of 1% by mass to 15% by mass with respect to the entire amount of the rapid-hardening mortar composition.

In this case, since the silica fume has a pozzolanic reaction, properties of long-term strength are improved. Furthermore, a hardened body obtained by hardening the rapid-hardening mortar composition is densified so that a total amount of pores becomes small, and progress of carbonation and progress of diffusion of chloride ions are suppressed so that durability is improved.

Further, the rapid-hardening mortar composition according to the aspect of the present invention may further contain a synthetic polymer-based thickening water-retention agent in an amount of 0.1% by mass to 0.3% by mass with respect to the entire amount of the rapid-hardening mortar composition.

In this case, the synthetic polymer-based thickening water-retention agent is in the form of a powder, and generates fine bubbles when being brought into contact with water. Thus, in a hardened body obtained by hardening the rapid-hardening mortar composition, entrained air is introduced in a simulative behavior, and freeze-thaw resistance (freezing and thawing resistance) is improved.

Further, the rapid-hardening mortar composition according to the aspect of the present invention may further contain an anti-freezing agent that consists of one or more of sodium acetate, calcium acetate, and calcium nitrite, in an amount of 1% by mass to 10% by mass with respect to the entire amount of the rapid-hardening mortar composition.

In this case, even under a cryogenic temperature environment where water is frozen, freezing of the rapid-hardening mortar composition which is kneaded with water can be suppressed, and properties of early age strength are increased.

Effects of the Invention

According to the aspect of the present invention, it is possible to provide a rapid-hardening mortar composition in which variations in setting initial time due to an environmental temperature are small, variations in setting initial time even in the case of being stored for a longer period are small, fluidity is high during a period from addition of water until hardening reaction proceeds, and properties of early age strength are excellent.

BRIEF DESCRIPTION OF THE DRAWINGS

FIG. 1(A) is an image with a magnification of 1,000 times, and FIG. 1(B) is an image with a magnification of 3,000 times.

2(B) is an EPMA mapping image of sodium obtained by performing elemental analysis of particles captured in the image.

Figure 3:
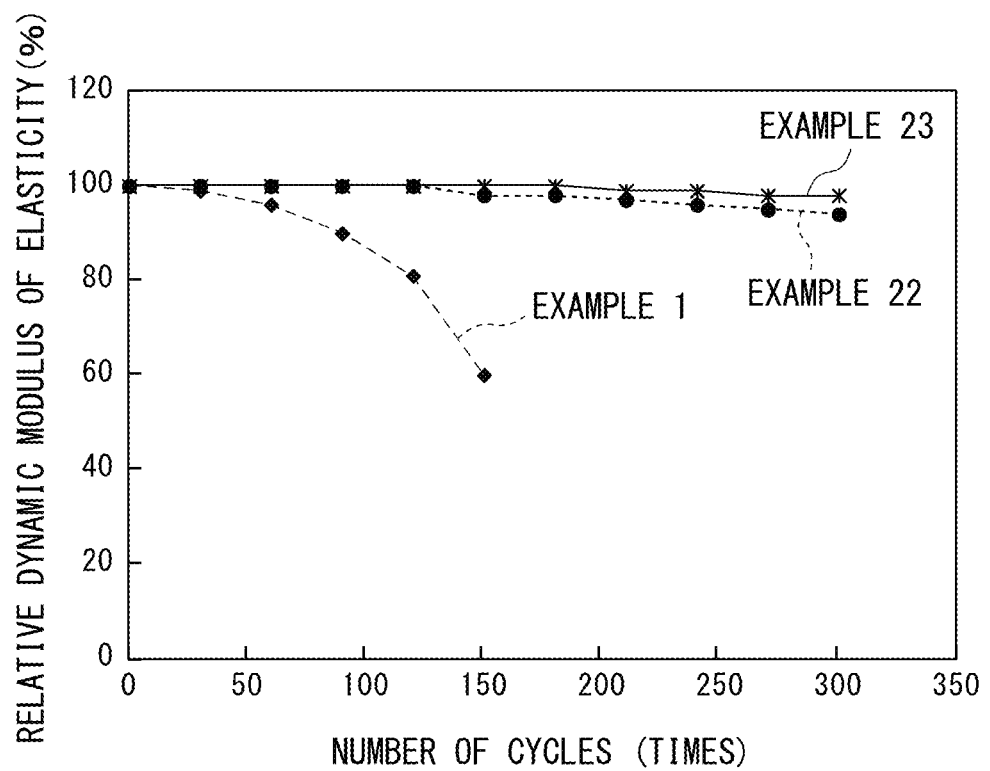

FIG. 3 is a graph showing measurement results of a freeze-thaw test of hardened bodies obtained by hardening rapid-hardening mortar compositions of Example 1, Example 22, and Example 23.

EMBODIMENTS FOR CARRYING OUT THE INVENTION

Embodiments of the present invention will be described below.

A rapid-hardening mortar composition of the present embodiment contains a rapid-hardening admixture, cement and a fine aggregate. The cement is contained in an amount of 100 parts by mass to 2,000 parts by mass with respect to 100 parts by mass of the rapid-hardening admixture. The rapid-hardening admixture is a composition that contains calcium aluminate, inorganic sulfate in an amount of 50 parts by mass to 200 parts by mass with respect to 100 parts by mass of the calcium aluminate, and a setting modifier in an amount of 0.1 parts by mass to 10 parts by mass with respect to 100 parts by mass of the calcium aluminate. The average particle diameter of the calcium aluminate in the rapid-hardening admixture is in a range of 8 μm to 100 μm, and the average particle diameter of the setting modifier is 5 μm or less. The rapid-hardening mortar composition of the present embodiment may further contain an admixture such as a setting modifier, short fibers, a powdered emulsion, silica fume, a synthetic polymer-based thickening water-retention agent, an anti-freezing agent, and the like.

The respective components of the rapid-hardening mortar composition of the present embodiment will be described below.

(Rapid-Hardening Admixture)

The rapid-hardening admixture is a composition that contains calcium aluminate, inorganic sulfate, and a setting modifier.

The calcium aluminate elutes calcium ions and aluminum ions when being brought into contact with water at the time of using the rapid-hardening mortar composition, and these ions are reacted with sulfate ions eluted from the inorganic sulfate to produce a hydrate such as ettringite ($3CaO \cdot Al_2O_3 \cdot 3CaSO_4 \cdot 32H_2O$) of needle-like crystal, monosulfate ($3CaO \cdot Al_2O_3 \cdot CaSO_4 \cdot 12H_2O$), or the like. Thereby, the calcium aluminate has an action of improving properties of early age strength of the rapid-hardening mortar composition. In the case where an elution rate of calcium ions and aluminum ions from the calcium aluminate becomes too low, reactivity with sulfate ions may be deteriorated, and properties of early age strength of the rapid-hardening mortar composition may be decreased. On the other hand, in the case where an elution rate of calcium ions and aluminum ions from the calcium aluminate becomes too high, reactivity with sulfate ions is increased and a setting initial time of the rapid-hardening mortar composition becomes too fast. Thus, it may be difficult to regulate the setting initial time even in the case of using a setting modifier, and it may be difficult to secure a sufficient pot life.

Therefore, in the present embodiment, the average particle diameter (average primary particle diameter) of the calcium aluminate is set to be in a range of 8 μm to 100 μm. In the case where the average particle diameter of the calcium aluminate is less than 8 μm, the elution rate of calcium ions and aluminum ions becomes too high, which may make it difficult to regulate the setting initial time of the rapid-hardening mortar composition. On the other hand, in the case where the average particle diameter of the calcium aluminate exceeds 100 μm, the elution rate of calcium ions and aluminum ions becomes too low, which may decrease properties of early age strength of the rapid-hardening mortar composition.

The average particle diameter of the calcium aluminate contained in the rapid-hardening mortar composition can be measured using, for example, a scanning electron microscope (SEM) and an electron probe microanalyzer (EPMA). That is, it is possible to perform measurements as follows: particles of the calcium aluminate contained in the rapid-hardening admixture are identified from an SEM image and results of elements detected by an elemental analysis with the EPMA of the rapid-hardening admixture; particle diameters are measured from the SEM image with respect to the particles identified as the calcium aluminate; and the average value thereof is obtained. Particles in which only calcium and aluminum are detected by the elemental analysis with the EPMA can be identified as the particles of the calcium aluminate.

As the calcium aluminate, it is preferable to use one having one or more compositions selected from the group consisting of $12CaO \cdot 7Al_2O_3$, $11CaO \cdot 7Al_2O_3 \cdot CaF_2$, and $CaO \cdot Al_2O_3$, and having a vitrification rate (percentage of glass content) of 80% or more. The vitrification rate is more preferably 80% to 98%, and particularly preferably 90% to 98%. The calcium aluminate having the above-mentioned composition and vitrification rate has a high elution rate of calcium ions and aluminum ions and a high reactivity when being brought into contact with water. Thus, it is possible to reliably improve the properties of early age strength of the rapid-hardening mortar composition.

Further, it is preferable that the calcium aluminate has a Blaine specific surface area of 3,000 $cm^2/g$ to 5,500 $cm^2/g$. Due to the Blaine specific surface area of 3,000 $cm^2/g$ or more, when the calcium aluminate is brought into contact with water, the elution rate of calcium ions and aluminum ions becomes high and the reactivity with sulfate ions eluted from the inorganic sulfate becomes high. Thus, it is possible to more reliably improve the properties of early age strength of the rapid-hardening mortar composition. On the other hand, due to the Blaine specific surface area of 5,500 $cm^2/g$ or less, when the calcium aluminate is brought into contact with water, the case where the elution rate of calcium ion and aluminum ion becomes excessively high is prevented, and the reactivity with sulfate ions is prevented from becoming too high. Even in the case where the Blaine specific surface area is 5,500 $cm^2/g$ or more, the early age strength of the rapid-hardening mortar composition becomes constant, which is economically not preferable due to excessive use of energy required for grinding. The Blaine specific surface area is measured by a specific surface area test using a Blaine air permeability apparatus described in JIS R 5201 "Physical Test Method for Cement".

The inorganic sulfate contained in the rapid-hardening admixture elutes sulfate ions when being brought into contact with water at the time of using the rapid-hardening mortar composition and these ions are reacted with calcium ions and aluminum ions eluted from the calcium aluminate to produce a hydrate such as ettringite of needle-like crystal, monosulfate, or the like. Thus, the inorganic sulfate has an action of improving properties of early age strength of the rapid-hardening mortar composition.

In the case where an elution rate of sulfate ions from the inorganic sulfate becomes low, reactivity with calcium ions and aluminum ions eluted from the calcium aluminate may be deteriorated, the time from start of setting to hardening may become longer, and properties of early age strength of the rapid-hardening mortar composition may be deteriorated. Therefore, it is preferable that the inorganic sulfate has a Blaine specific surface area of 8,000 cm$^2$/g or more. Since the inorganic sulfate having the above-mentioned Blaine specific surface area has a high elution rate of sulfate ions and a high reactivity with calcium ions and aluminum ions eluted from the calcium aluminate, it is possible to reliably improve properties of early age strength of the rapid-hardening mortar composition. In addition, it is preferable that the Blaine specific surface area of the inorganic sulfate is 12,000 cm$^2$/g or less. In the case where the Blaine specific surface area becomes too large, the elution rate of sulfate ions becomes too high and the reactivity with calcium ions and aluminum ions becomes excessively high. Thus, the time from start of setting to hardening becomes shorter, which may make it difficult to secure a sufficient pot life even in the case of using a setting modifier. In addition, since fine particles of the inorganic sulfate which are hardly soluble in water are contained, the amount of water necessary to obtain a required fluidity is increased, and thus a decrease in strength may occur in a hardened body of the rapid-hardening mortar composition.

The inorganic sulfate is preferably anhydrite, particularly preferably anhydrite type II. The anhydrite (in particular, anhydrite type II) has a high reactivity with the calcium aluminate. Thus, it is possible to more reliably improve properties of early age strength of the rapid-hardening mortar composition.

The setting modifier contained in the rapid-hardening admixture has an action of regulating (controlling) the time from addition of water to the rapid-hardening mortar composition until setting of the rapid-hardening mortar composition starts at the time of using the rapid-hardening mortar composition, that is, an action of delaying a hardening time of mortar. Due to delayed hardening time of the mortar by the setting modifier, fluidity of the rapid-hardening mortar composition is improved during a period from addition of water to the rapid-hardening mortar composition until hardening reaction of the mortar proceeds.

It is considered that the setting modifier is dissolved in water and chelated with calcium ions or aluminum ions eluted from the rapid-hardening admixture (calcium aluminate) to form a film on a surface of the rapid-hardening admixture, so that elution of calcium ions and aluminum ions from the rapid-hardening admixture is temporarily suppressed; and thereby, a delaying action of a hardening time of the mortar is developed by the setting modifier. However, since the film formed on the surface of the rapid-hardening admixture is extremely thin, the film is dissolved and disappears in a relatively short time. After disappearance of the film, re-elution of calcium ions and aluminum ions from the rapid-hardening admixture begins and hardening reaction of the mortar proceeds.

In the present embodiment, the setting modifier contained in the rapid-hardening admixture is fine particles having an average particle diameter (average primary particle diameter) of 5 μm or less. Therefore, it is possible to rapidly dissolve the setting modifier in water over a relatively wide temperature range. The average particle diameter of the setting modifier is preferably 1 μm or more. In the case where the average particle diameter is less than 1 μm, agglomerated particles may be easily formed.

The setting modifier contains one or more of inorganic carbonates, oxycarboxylic acids, sodium aluminate, and sodium sulfate. Since these agents are easily dissolved in water, the setting modifier contains one or more of these agents so that a setting modifier action by the setting modifier is exerted at an early stage. Thus, it is possible to reliably reduce variations in setting initial time of the rapid-hardening mortar composition due to an environmental temperature. In addition, since a setting modifier action by the setting modifier is exerted at an early stage, a setting initial time becomes more stable and longer, and fluidity after addition of water increases.

The inorganic carbonate is preferably carbonate or hydrogen carbonate of an alkali metal. Examples of the inorganic carbonate include sodium carbonate, potassium carbonate, sodium hydrogen carbonate, potassium hydrogen carbonate, lithium carbonate, and ammonium carbonate. One of these inorganic carbonates may be used alone, or two or more thereof may be used in combination. Examples of the oxycarboxylic acid include tartaric acid, citric acid, malic acid, gluconic acid, and maleic acid. One of these oxycarboxylic acids may be used alone, or two or more thereof may be used in combination.

It is preferable that two or more of inorganic carbonates, oxycarboxylic acids, sodium aluminate, and sodium sulfate are used in combination as the setting modifier. As combinations of two or more thereof, a 3-member combination of inorganic carbonates, oxycarboxylic acids, and sodium aluminate is preferable, and a 4-member combination of inorganic carbonates, oxycarboxylic acids, sodium aluminate, and sodium sulfate is more preferable. In the case where two or more setting modifiers are used in combination, the only required condition is that at least one of the setting modifiers consists of fine particles having an average particle diameter of 5 μm or less.

Among the setting modifiers, sodium sulfate has a particularly high rate of dissolution in water. Therefore, sodium sulfate has a high effect of improving fluidity of the rapid-hardening mortar composition after addition of water. In addition, since sodium sulfate is easily dissolved in water over a wide temperature range, it also has an effect of reducing temperature dependency, with respect to a setting initial time, of the rapid-hardening mortar composition after addition of water.

It is preferable that the fine particles of the setting modifier are dispersed in the rapid-hardening admixture as primary particles or aggregated particles close thereto. In the case where the setting modifier is dispersed as primary particles or aggregated particles close thereto, a rate of dissolution thereof in water is improved, and a setting modifier action by the setting modifier is exerted at an early stage. Thus, it is possible to reliably reduce variations in setting initial time due to an environmental temperature. In addition, it is preferable that the fine particles of the setting modifier are adhered to a surface of the calcium aluminate. In this case, since the setting modifier comes into contact with water prior to the calcium aluminate, and thus is easily dissolved, so that a setting modifier action by the setting modifier is exerted at an early stage. Thus, it is possible to more reliably reduce variations in setting initial time due to an environmental temperature.

The average particle diameter of the setting modifier contained in the rapid-hardening admixture can be measured using, for example, an SEM and an EPMA. That is, it is possible to perform measurements as follows: particles of the setting modifier contained in the rapid-hardening admixture are identified from an SEM image and results of elements detected by an elemental analysis with an EPMA of the rapid-hardening admixture; particle diameters are measured from the SEM image with respect to the particles identified as the setting modifier; and the average value thereof is obtained. For example, particles in which only sodium is detected by the elemental analysis with the EPMA can be identified as the particles of sodium carbonate (inorganic carbonate).

In the present embodiment, the blending amounts of the calcium aluminate, the inorganic sulfate, and the setting modifier contained in the rapid-hardening admixture are set such that, with respect to 100 parts by mass of the calcium aluminate, the amount of the inorganic sulfate is in a range of 50 parts by mass to 200 parts by mass, and the amount of the setting modifier is in a range of 0.1 parts by mass to 10 parts by mass.

In the case where the blending amount of the inorganic sulfate is too small, a production amount of a reaction product (ettringite, monosulfate) of the inorganic sulfate and the calcium aluminate hydrate may be decreased, and properties of early age strength of the rapid-hardening mortar composition may be decreased. On the other hand, in the case where the blending amount of the inorganic sulfate is too large, a setting initial time of the rapid-hardening mortar composition becomes fast, which may make it difficult to secure a sufficient pot life. In addition, the amounts of calcium ions and aluminum ions eluted from the calcium aluminate are relatively small with respect to an amount of sulfate ions, so that a production amount of ettringite is reduced. Thus, properties of early age strength of the rapid-hardening mortar composition may be decreased. Furthermore, due to influence of the remaining inorganic sulfate, an amount of expansion after hardening becomes excessive, which may cause expansion breakdown.

Further, in the case where the blending amount of the setting modifier is too small, an action of the setting modifier is completed in a short period of time. Thus, a setting initial time of the rapid-hardening mortar composition becomes fast, which may make it difficult to secure a sufficient pot life. On the other hand, in the case where the blending amount of the setting modifier is too large, an action of the setting modifier may continue for a predetermined time or more, and properties of early age strength of the rapid-hardening mortar composition may be decreased.

The rapid-hardening admixture can be produced, for example, by a method including: a mixing and grinding step of mixing and grinding a clinker containing calcium aluminate and a setting modifier to prepare a mixed and ground product; and a mixing step of mixing the resultant mixed and ground product with inorganic sulfate.

In the above-mentioned method for producing a rapid-hardening admixture, the clinker used as a raw material of the calcium aluminate has a high hardness as compared with the setting modifier. Therefore, by mixing and grinding the clinker of calcium aluminate and the setting modifier, the setting modifier selectively becomes fine particles, and fine particles of the setting modifier are produced. The fine particles of the setting modifier easily adhere to surfaces of relatively coarse calcium aluminate particles. Accordingly, in the mixing and grinding step, it is possible to obtain a mixed and ground product in which the fine particles of the setting modifier are dispersed as primary particles or aggregated particles close thereto in a state of being adhered to a surface of the calcium aluminate. As a mixing and grinding apparatus, a grinding apparatus such as an H type mill, a vertical type mill, a tube mill, and the like can be used, but not limited thereto. Various grinding apparatuses commonly used as a grinding apparatus for clinker can be used.

The clinker containing calcium aluminate is preferably a clinker mineral.

The average particle diameter of the clinker of calcium aluminate before grinding is preferably 1 mm to 30 mm. In addition, the particle diameter of the setting modifier before grinding is preferably 150 μm to 500 μm.

In the mixing and grinding step, the mixing and grinding is preferably carried out until a Blaine specific surface area of the mixed and ground product becomes in a range of 3,000 $cm^2$/g to 5,500 $cm^2$/g, and is particularly preferably carried out until the Blaine specific surface area becomes in a range of 3,000 $cm^2$/g to 4,500 $cm^2$/g. By carrying out the mixing and grinding until the Blaine specific surface area falls within the above-mentioned range, the clinker containing calcium aluminate and the setting modifier are sufficiently mixed and ground; and thereby, it is possible to reliably obtain a mixed and ground product in which the fine particles of the setting modifier are dispersed as primary particles or aggregated particles close thereto in a state of being adhered to a surface of the calcium aluminate. In addition, the average particle diameter of the calcium aluminate in the mixed and ground product is usually in a range of 8 μm to 100 μm, and the average particle diameter of the setting modifier is usually 5 μm or less.

In the mixing step, the inorganic sulfate to be mixed with the mixed and ground product obtained in the mixing and grinding step is preferably anhydrite having a Blaine specific surface area of 8,000 $cm^2$/g or more.

In the mixing step, the mixed and ground product and the inorganic sulfate are mixed by a dry mixing. As a dry mixing apparatus, a mixer such as a V type mixer, a ribbon mixer, a Proshear mixer, and the like can be used, but not limited thereto. Various mixers commonly used as a mixing apparatus for cement materials can be used. A mixing time can be appropriately adjusted depending on a capacity of the mixing apparatus and blending amounts of the respective materials.

(Cement)

As the cement, ordinary Portland cement, high early strength Portland cement, moderate heat Portland cement, low heat Portland cement, Portland blast-furnace cement, Portland pozzolan cement, Portland fly ash cement, silica fume cement, and the like can be used. One of the cements may be used alone, or two or more thereof may be used in combination. The cement is preferably Portland cement, in particular, ordinary Portland cement.

The blending amount of the cement is generally in a range of 100 parts by mass to 2,000 parts by mass with respect to 100 parts by mass of the rapid-hardening admixture. In the case where the blending amount of the cement is within the above-mentioned range, it is possible to obtain a rapid-hardening mortar composition which is excellent in properties of early age strength by the rapid-hardening admixture and in properties of long-term strength by the cement.

(Fine Aggregate)

The fine aggregate has an action of suppressing shrinkage (autogenerous shrinkage) of a hardened body due to hardening of the rapid-hardening mortar composition and shrinkage (drying shrinkage) due to dissipation of moisture after hardening. The fine aggregate is preferably sand, more preferably sand having a particle diameter of 150 to 3,000 μm, and even more preferably sand having a particle diameter of 200 to 1,500 μm. In addition, the fine aggregate may be sand having a particle diameter of 90 to 1,000 μm, and may also be sand having a particle diameter of 90 to 200 μm. In the case where the particle diameter of the sand becomes too small, agitation performance of mortar or cement milk prepared by mixing the rapid-hardening mortar composition with water and wear resistance of the hardened body may be decreased, and skid resistance thereof may be decreased. On the other hand, in the case where the particle diameter of the sand becomes too large, sand may easily settle in the mortar or cement milk, and adhesion properties of the mortar or cement milk to a concrete structure and injection properties thereof to a pavement body may be decreased.

For example, in the case of being used as a patching repair material, the blending amount of the fine aggregate is in a range of 200 parts by mass to 1,000 parts by mass with respect to 100 parts by mass of the rapid-hardening admixture. In the case where the blending amount of the fine aggregate is too small, not only an effect of reducing shrinkage of the hardened body may not be sufficiently obtained, but also agitation performance and wear resistance of the mortar may be deteriorated, and skid resistance may be decreased. On the other hand, in the case where the blending amount of the fine aggregate is too large, properties of early age strength may be decreased, and material separation may occur and bleeding may easily occur.

On the other hand, in the case of being used as an injection grout for pavement, the blending amount of the fine aggregate is in a range of 10% by mass to 67% by mass with respect to the entire amount of the rapid-hardening mortar composition. In the case where the blending amount of the fine aggregate is too small, not only an effect of reducing shrinkage of the hardened body may not be sufficiently obtained, but also agitation performance and wear resistance of the cement milk may be decreased and skid resistance may be decreased. On the other hand, in the case where the blending amount of the fine aggregate is too large, properties of early age strength may be decreased, and material separation may occur and bleeding may easily occur.

(Setting Modifier)

In the rapid-hardening mortar composition of the present embodiment, as described above, fine particles of the setting modifier having an average particle diameter of 5 μm or less are contained as a constituent of the rapid-hardening admixture. The setting modifier may be further added so that an amount of the setting modifier with respect to the entire amount of the rapid-hardening mortar composition is in a range of 0.01% by mass to 5% by mass. Herein, the amount of the setting modifier with respect to the entire amount of the rapid-hardening mortar composition is a total amount of the setting modifier (also referred to as a first setting modifier) contained in the rapid-hardening admixture and the setting modifier (also referred to as a second setting modifier) added separately from the rapid-hardening admixture. In this case, since a setting time can be regulated by the setting modifier contained in the rapid-hardening admixture and the setting modifier added separately from the rapid-hardening admixture, it is possible to more reliably reduce variations in setting initial time of the rapid-hardening mortar composition due to an environmental temperature and a long-term storage. In addition, by separately adding the setting modifier, it is possible to regulate (control) the setting initial time of the rapid-hardening mortar composition to a required time. In addition, in the rapid-hardening mortar composition of the present embodiment, the setting modifier contained in the rapid-hardening admixture is fine particles and easily dissolved in water, so that a sufficient pot life can be normally secured. Thus, the amount of the setting modifier to be separately added can be reduced.

In the case where the amount of the setting modifier is less than 0.01% by mass with respect to the entire amount of the rapid-hardening mortar composition, an action of regulating a setting time may be insufficient. On the other hand, in the case where the amount of the setting modifier exceeds 5% by mass with respect to the entire amount of the rapid-hardening mortar composition, properties of long-term strength by the mortar may be decreased.

The setting modifier added separately from the rapid-hardening admixture may be added alone to the rapid-hardening mortar composition. However, the setting modifier is preferably added as a premixed mixture of an inorganic powder and the setting modifier. The mixture of the inorganic powder and the setting modifier is preferably a highly concentrated-setting modifier-containing mixture in which the setting modifier is contained in an amount of 50 parts by mass to 300 parts by mass with respect to 100 parts by mass of the inorganic powder. By adding the setting modifier to the rapid-hardening mortar composition as the highly concentrated-setting modifier-containing mixture, the setting modifier is easy to be uniformly dispersed in the rapid-hardening mortar composition. As the inorganic powder, cement (in particular, Portland cement), limestone powder, silica stone powder, blast furnace slag powder, coal ash, fly ash, clay minerals, calcium aluminate powder, or inorganic sulfates powder can be used. The inorganic powder is preferably a fine powder having a Blaine specific surface area in a range of 2,500 cm/g to 5,000 $cm^2/g$. Since the inorganic powder having a Blaine specific surface area in the above-mentioned range has a high dispersibility, the highly concentrated-setting modifier-containing mixture in which this inorganic powder is used is easy to be uniformly dispersed in the rapid-hardening mortar composition. The particle diameter of the setting modifier contained in the highly concentrated-setting modifier-containing mixture is preferably in a range of 1 μm to 500 μm. Since the setting modifier having a particle diameter in the above-mentioned range has a high dispersibility in the inorganic powder, it is easy to prepare a highly concentrated-setting modifier-containing mixture that has a uniform composition.

(Short Fibers)

The short fibers act as a reinforcing material. Therefore, a hardened body obtained by hardening the rapid-hardening mortar composition including the short fibers has improved cracking resistance and excellent durability against fatigue.

As the short fibers, organic short fibers and carbon short fibers can be used. Examples of the organic short fibers include PVA short fibers (polyvinyl alcohol short fibers), polyamide short fibers, aramid short fibers, polypropylene short fibers, rayon short fibers, and the like. One of these short fibers may be used alone, or two or more thereof may be used in combination.

The fiber length of the short fibers is preferably in a range of 1 mm to 10 mm. In the case where the fiber length is shorter than 1 mm, a sufficient fiber reinforcing effect may not be obtained. On the other hand, in the case where the fiber length exceeds 10 mm, fluidity may be impaired by resistance of the fibers, and working properties may be hindered, for example, injection properties to a narrow portion or a semi-flexible pavement may be decreased. A fiber diameter is usually in a range of 5 μm to 100 μm.

The blending amount of the short fibers is generally in a range of 0.1% by mass to 0.3% by mass with respect to the entire amount of the rapid-hardening mortar composition. In the case where the blending amount of the short fibers is too small, an action of improving cracking resistance of a hardened body and an action of improving durability against fatigue may be insufficient. On the other hand, in the case where the blending amount of the short fibers is too large, fluidity of a mixture of the rapid-hardening mortar composition and water may be decreased.

(Powdered Emulsion)

The powdered emulsion is a resin having low water absorbability and low water permeability, and has an action of making water hardly penetrate into a hardened body obtained by hardening the rapid-hardening mortar composition. In addition, the powdered emulsion has an effect of improving adhesion of the rapid-hardening mortar composition to a concrete structure. Therefore, the rapid-hardening mortar composition containing the powdered emulsion is excellent in freeze-thaw resistance after being immersed in water and has improved adhesion to the concrete structure.

Examples of the powdered emulsion include vinyl acetate/Veova/acrylic acid ester copolymer resin, vinyl acetate copolymer resin, vinyl acetate/ethylene copolymer resin, vinyl acetate/acryl copolymer resin, acrylic resin, and the like. One of these powdered emulsions may be used alone, or two or more thereof may be used in combination.

The blending amount of the powdered emulsion is generally in a range of 0.5% by mass to 30% by mass with respect to the entire amount of the rapid-hardening mortar composition. In the case where the blending amount of the powdered emulsion is too small, an action of improving freeze-thaw resistance of a hardened body of the rapid-hardening mortar composition and an action of improving adhesion to a concrete structure may be insufficient. On the other hand, in the case where the blending amount of the powdered emulsion is too large, fluidity of a mixture of the rapid-hardening mortar composition and water may be decreased.

(Silica Fume)

Silica fume has a pozzolanic reaction. Therefore, the rapid-hardening mortar composition containing the silica fume has improved properties of long-term strength, and a hardened body obtained by hardening the rapid-hardening mortar composition is densified, so that the total amount of pores becomes small, and progress of carbonation and progress of diffusion of chloride ions are suppressed.

The blending amount of the silica fume is preferably in a range of 0.5% by mass to 30% by mass with respect to the entire amount of the rapid-hardening mortar composition. In the case where the blending amount of the silica fume is too small, properties of long-term strength due to a pozzolan reaction, an effect of suppressing carbonation due to densification of a hardened body structure of the rapid-hardening mortar composition, and an effect of suppressing penetration of chloride ions may not be sufficient. On the other hand, in the case where the blending amount of the silica fume is too large, a quantity (proportion) of the rapid-hardening admixture in the rapid-hardening mortar composition may become relatively small, and properties of early age strength may be deteriorated.

(Synthetic Polymer-Based Thickening Water-Retention Agent)

The synthetic polymer-based thickening water-retention agent has an action of generating fine bubbles when being brought into contact with water. Therefore, in a hardened body obtained by hardening the rapid-hardening mortar composition containing the synthetic polymer-based thickening water-retention agent, entrained air is introduced in a simulative behavior, and freeze-thaw resistance is improved.

The blending amount of the synthetic polymer-based thickening water-retention agent is preferably in a range of 0.1% by mass to 0.3% by mass with respect to the entire amount of the rapid-hardening mortar composition. In the case where the blending amount of the synthetic polymer-based thickening water-retention agent is too small, an action of improving freeze-thaw resistance of the hardened body of the rapid-hardening mortar composition may become insufficient. On the other hand, in the case where the blending amount of the synthetic polymer-based thickening water-retention agent is too large, fluidity of a mixture of the rapid-hardening mortar composition and water may be decreased, and excessive bubbles may be included to reduce strength.

(Anti-Freezing Agent)

Sodium acetate, calcium acetate, or calcium nitrite reacts with water to generate heat, and acts as an anti-freezing agent to prevent freezing of a mixture of the rapid-hardening mortar composition and water under a cryogenic temperature environment where water is frozen. Therefore, in the rapid-hardening mortar composition containing the anti-freezing agent, freezing of the rapid-hardening mortar composition kneaded with water even under a cryogenic temperature environment can be suppressed, and properties of early age strength are increased.

One of the anti-freezing agents may be used alone, or two or more thereof may be used in combination.

The blending amount of the anti-freezing agent is generally in a range of 1% by mass to 10% by mass with respect to the entire amount of the rapid-hardening mortar composition. In the case where the blending amount of the anti-freezing agent is too small, an action as the anti-freezing agent may become insufficient so that the rapid-hardening mortar composition freezes, and no strength may be produced at all. On the other hand, in the case where the blending amount of the anti-freezing agent is too large, a salting-out action may occur in a mixture of the rapid-hardening mortar composition and water, and fluidity may be decreased.

The rapid-hardening admixture used in the rapid-hardening mortar composition of the present embodiment having a constitution as described above is easily dissolved in water, because the average particle diameter of the calcium aluminate is 8 μm to 100 μm, and the average particle diameter of the setting modifier is 5 μm or less, so that the setting modifier is fine as compared with the calcium aluminate. Therefore, when water is added to the rapid-hardening mortar composition of the present embodiment, the setting modifier is rapidly dissolved in water in a stable manner over a wide temperature range, and a setting modifier action by the setting modifier is exerted at an early stage. Thus, variations in setting initial time due to an environmental temperature become small. In addition, since the setting modifier action by the setting modifier is exerted at an early stage, the setting initial time becomes stable and long, and fluidity after addition of water becomes high. Furthermore, after completion of the setting modifier action by the setting modifier, hardening acceleration action of cement is exerted by the calcium aluminate and the inorganic sulfate; and therefore, it is possible to improve properties of early age strength of the rapid-hardening mortar composition. Furthermore, the setting modifier is dispersed as fine particles in the rapid-hardening mortar composition. Thus, even in the case where the rapid-hardening mortar composition of the present embodiment is stored for a long period of time, it is unlikely that the setting modifier is segregated and an amount of the setting modifier becomes non-uniform. Therefore, even in the case of being stored for a long period of time, variations in setting initial time are small and properties of early age strength are excellent.

As described above, in the rapid-hardening mortar composition of the present embodiment, variations in setting initial time due to an environmental temperature are small, and properties of early age strength are excellent. Thus, the rapid-hardening mortar composition can be suitably used as a raw material for mortar (patching repair material) used in repair works of a concrete structure to be constructed by a construction method such as a plastering method, a spraying method, a filling method, and a prepacking method. In addition, the rapid-hardening mortar composition can be suitably used as a raw material (injection grout for pavement) for a back-filling grout material used for PC pavement and RC pavement, cement milk used for semi-flexible pavement, and the like which are mainly used outdoor. In particular, since the rapid-hardening mortar composition of the present embodiment has a high early age strength, it is, for example, possible to form a pavement having practical strength that allows a road to be opened to traffic in 2 hours.

In the rapid-hardening mortar composition of the present embodiment, in the case where the fine aggregate is contained in an amount of 200 parts by mass to 1,000 parts by mass with respect to 100 parts by mass of the rapid-hardening admixture, properties of early age strength are excellent, and shrinkage of a hardened body due to hardening of the rapid-hardening mortar composition and shrinkage due to dissipation of moisture after hardening are suppressed. Therefore, the occurrence of cracks in the hardened body can be suppressed, and strength of the hardened body is increased. Accordingly, this rapid-hardening mortar composition is particularly useful as a patching repair material.

On the other hand, in the rapid-hardening mortar composition of the present embodiment, in the case where the fine aggregate may be contained in an amount of 10% by mass to 67% by mass with respect to the entire amount of the rapid-hardening mortar composition, properties of early age strength are excellent, and fluidity of the fine aggregate at the time of being added with water is improved. Even in fine (minute) spaces such as voids of an open-graded asphalt mixture in semi-flexible pavements, the fine aggregate becomes a medium. Thus, it is possible to satisfactorily fill the spaces.

Further, in the rapid-hardening mortar composition of the present embodiment, the setting modifier contains one or more of inorganic carbonates, oxycarboxylic acids, sodium aluminate, and sodium sulfate. Thus, it is possible to reliably reduce variations in setting initial time of the rapid-hardening mortar composition due to an environmental temperature. In addition, since a setting modifier action by the setting modifier is exerted at an early stage, a setting initial time becomes more stable and longer, and fluidity after addition of water increases. Since sodium sulfate has a particularly high rate of dissolution in water, sodium sulfate has a high effect of improving fluidity of the rapid-hardening mortar composition after addition of water.

Further, a hardened body of the rapid-hardening mortar composition containing the short fibers has improved cracking resistance and strength and has excellent durability against fatigue. Therefore, the rapid-hardening mortar composition containing such short fibers can be suitably used for restoring a cross section of a site where a repetitive fatigue load is applied, such as a concrete slab or a girder of a bridge. In addition, this rapid-hardening mortar composition can be suitably used as a material of a back-filling grout material used for PC pavement and RC pavement of airport runways where a heavy load is applied.

Further, the rapid-hardening mortar composition containing the powdered emulsion is excellent in freeze-thaw resistance after being immersed in water and has improved adhesion to the concrete structure. Therefore, the rapid-hardening mortar composition including the powdered emulsion can be suitably used for cross-section restoration of various concrete structures, such as pier, bridge, tunnel, and concrete pavement. In addition, this rapid-hardening mortar composition can be suitably used as an injection grout for pavement in cold districts.

Further, in a hardened body of the rapid-hardening mortar composition containing the silica fume, progress of carbonation and progress of diffusion of chloride ions are suppressed. Therefore, the rapid-hardening mortar composition containing the silica fume can be suitably used for restoring concrete structures impaired by salt damage.

Further, a hardened body of the rapid-hardening mortar composition containing the synthetic polymer-based thickening water-retention agent has improved freeze-thaw resistance. Therefore, the rapid-hardening patching repair material containing the synthetic polymer-based thickening water-retention agent can be suitably used for restoring concrete structures in cold districts.

Further, the rapid-hardening mortar composition containing the anti-freezing agent makes it possible to obtain a hardened body having high properties of early age strength even under a cryogenic temperature environment. Therefore, this rapid-hardening mortar composition containing the anti-freezing agent can be suitably used as an injection grout for pavement in cold districts.

Although the rapid-hardening mortar composition which is an embodiment of the present invention has been described above, the present invention is not limited thereto and can be appropriately changed within a scope that does not depart from the technical features of the invention.

For example, the rapid-hardening mortar composition may contain a water-reducing agent, an air entraining and water-reducing agent, a high range water-reducing agent, a high range air entraining and water-reducing agent, a superplasticizing agent, a waterproofing agent, a foaming agent, a blowing agent, a defoaming agent, an anti-rust agent for reinforced concrete, an admixing agent which is non-separable in water, a water-retention agent, a drying shrinkage reducing agent, an anti-washout admixture for underwater (viscosity agent), an anti-freezing agent, and the like.

EXAMPLES

Next, examples of the present invention will be described in detail together with comparative examples.

[Materials Used]

Types, compositions, and abbreviations of the materials used in these examples and comparative examples are shown in Table 1.

TABLE 1

| Material | Composition and the like | Abbreviation |
|---|---|---|
| Calcium aluminate clinker | $12CaO \cdot 7Al_2O_3$, vitrification rate: 92%<br>Chemical composition $Al_2O_3$: 45.1%, CaO: 47.3%, $SiO_2$: 3.9% | CA-CL |
| Inorganic sulfate | $CaSO_4$, hydrofluoric acid anhydrite type II, Blaine specific surface area of 9,850 $cm^2/g$ | CS |
| Ordinary Portland cement | Manufactured by Mitsubishi Materials Corporation, Blaine specific surface area of 3,340 $cm^2/g$ | N |
| High early strength Portland cement | Manufactured by Mitsubishi Materials Corporation, Blaine specific surface area of 4,250 $cm^2/g$ | H |
| Inorganic carbonate | $Na_2CO_3$, sodium carbonate (anhydrous neutral mirabilite), particle size of 45 to 90 μm | Na-1 |
| | $Na_2CO_3$, sodium carbonate (anhydrous neutral mirabilite), particle size of 90 to 150 μm | Na-2 |
| | $Na_2CO_3$, sodium carbonate (anhydrous neutral mirabilite), particle size of 150 to 500 μm | Na-3 |
| Sodium aluminate | $Na_2AlO_2$, sodium aluminate, particle size of 45 to 90 μm | Al-1 |
| | $Na_2AlO_2$, sodium aluminate, particle size of 90 to 150 μm | Al-2 |
| | $Na_2AlO_2$, sodium aluminate, particle size of 150 to 500 μm | Al-3 |
| Oxycarboxylic acid | Tartaric acid, particle size of 45 to 90 μm | Ta-1 |
| | Tartaric acid, particle size of 90 to 150 μm | Ta-2 |
| | Tartaric acid, particle size of 150 to 500 μm | Ta-3 |
| Sodium sulfate | $Na_2SO_4$, sodium sulfate, particle size of 150 to 500 μm | NS-3 |
| Fine aggregate | Dry silica sand (particle diameter of 150 μm to 3,000 μm) silica sand no. 3:no. 4:no. 5:no. 6 = 1:2:2:1 (mass ratio) | S3-6 |
| | Dry silica sand (particle diameter of 90 μm to 200 μm) | S |
| Silica fume | Manufactured by EFACO (BET specific surface area of 22.5 $m^2/g$) | SF |
| Synthetic polymer-based thickening water-retention agent | Manufactured by BASF, STARVIS S5514F | Ad |
| Defoaming agent | San Nopco Limited, SN DEFOAMER 14HP | 14HP |
| Organic short fibers | Unitika Ltd., PVA fibers, VINYLON AB, fiber length of 6 mm | PVA |
| Powdered emulsion | Manufactured by Nichigo-Movinyl Co., Ltd., LDM2071P, vinyl acetate/Veova/acrylic acid ester copolymer resin | P |
| Water-reducing agent | Lion Corporation, POLITY MX-335S, polycarboxylic acid-based high range water-reducing agent | MX |
| Anti-freezing agent | Calcium nitrite, Manol Corporation, MANOL anti-freezing agent NAC | CN |

[Preparation of Rapid-Hardening Admixture (SA-1)]

100 parts by mass of calcium aluminate clinker (CA-CL), and, as setting modifiers, 1.0 parts by mass of sodium carbonate (Na-3), 0.5 parts by mass of sodium aluminate (Al-3), and 0.5 parts by mass of tartaric acid (Ta-3) were charged into a mixing and grinding machine, and were mixed and ground until a Blaine specific surface area thereof reached 4,500 $cm^2/g$. The average particle diameter of the calcium aluminate contained in the resulting mixed and ground product was 15 μm and the average particle diameter of the sodium carbonate was 3.0 μm. The average particle diameter of the sodium carbonate was measured by the following method.

(Method for Measuring Average Particle Diameter of Sodium Carbonate)

Figure 1:
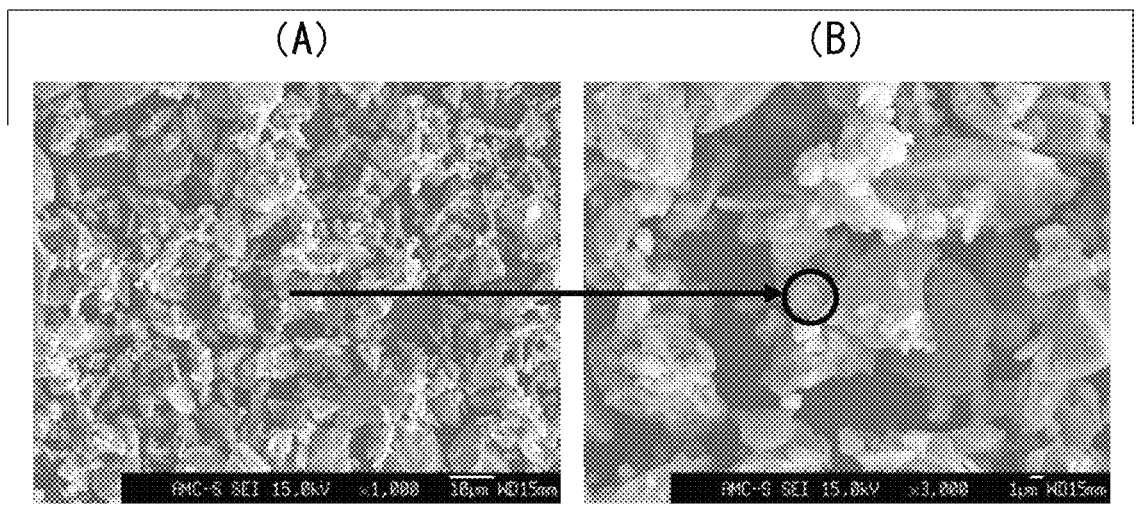
FIG. 1 shows scanning electron microscopic images of a mixed and ground product of a calcium aluminate clinker and a setting modifier which is produced in Example 1.

First, a particle shape of the resulting mixed and ground product was observed using a scanning electron microscope (SEM). FIG. 1 shows SM images of the mixed and ground product. FIG. 1(A) shows an SEM image with a magnification of 1,000 times, and FIG. 1(B) shows an SEM image with a magnification of 3,000 times.

Figure 2:
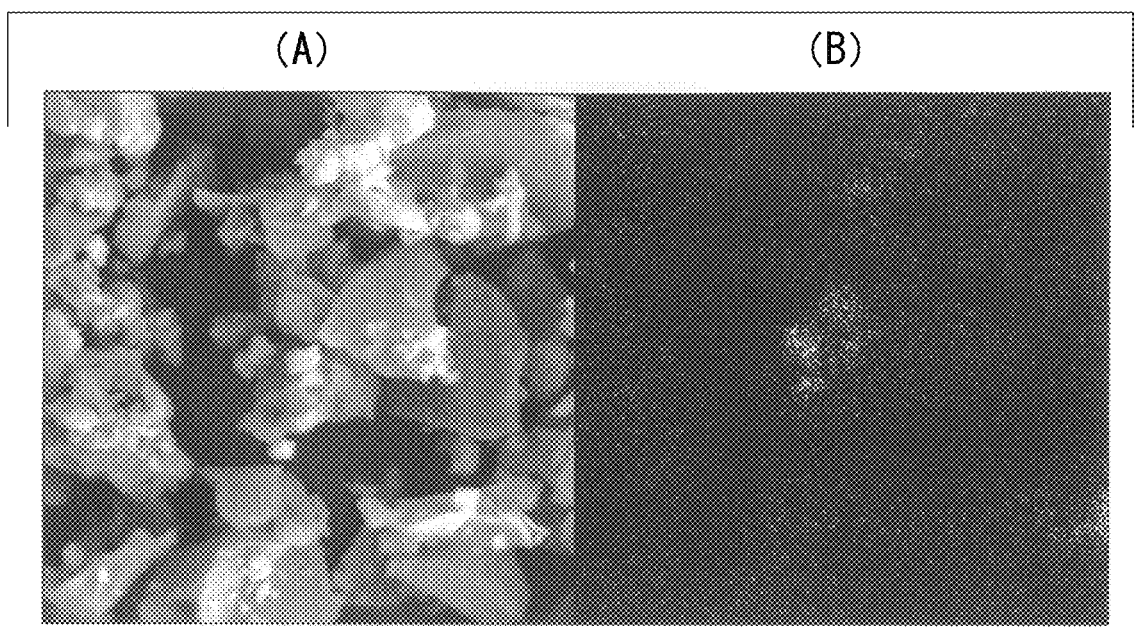
FIG. 2(A) is a scanning electron microscopic image obtained by enlarging a circled area in FIG. 1(B), and FIG.

Next, element analysis of the particles captured in the SEM images was carried out using an electron probe micro analyzer (EPMA). FIG. 2 shows the results. FIG. 2(A) is an SEM image obtained by enlarging a circled area in FIG. 1(B), and FIG. 2(B) is a mapping image of an element obtained by performing elemental analysis of particles captured in the SEM image using the EPMA. In FIG. 2(B), a white part represents sodium. From the SEM image of FIG. 2(A) and the mapping image of FIG. 2(B), particles of sodium carbonate were identified, and the longest diameter of the particle identified as the sodium carbonate was measured using the SFM image of FIG. 1(B). By repeating this operation, particle diameters of 100 sodium carbonate particles were measured, and an average value thereof was calculated.

Anhydrite (CS) as the inorganic sulfate was added to a mixer in an amount of 120 parts by mass with respect to 100 parts by mass of the mixed and ground product obtained as described above, and mixed. The obtained mixture was designated as a rapid-hardening admixture (SA-1).

[Preparation of Rapid-Hardening Admixture (SA-2)]

Calcium aluminate clinker (CA-CL) was charged into a mixing and grinding machine, and ground until a Blaine specific surface area thereof reached 4,500 cm$^2$/g, to obtain a calcium aluminate powder. Anhydrite (CS) was charged into a mixer in an amount of 120 parts by mass with respect to 100 parts by mass of the obtained calcium aluminate powder, and mixed. The obtained mixture was designated as a rapid-hardening admixture (SA-2).

[Preparation of Rapid-Hardening Admixture (SA-3)]

100 parts by mass of calcium aluminate clinker (CA-CL), and, as setting modifiers, 1.0 parts by mass of sodium carbonate (Na-3), 0.5 parts by mass of sodium aluminate (Al-3), 0.5 parts by mass of tartaric acid (Ta-3), and 1.0 parts by mass of sodium sulfate (NS-3) were charged into a mixing and grinding machine, and were mixed and ground until a Blaine specific surface area thereof reached 4,560 cm$^2$/g. The average particle diameter of the calcium aluminate contained in the resulting mixed and ground product was 14.2 μm and the average particle diameter of the sodium carbonate was 2.8 μm.

Anhydrite (CS) was charged into a mixer in an amount of 120 parts by mass with respect to 100 parts by mass of the mixed and ground product obtained as described above, and mixed. The obtained mixture was designated as a rapid-hardening admixture (SA-3).

[Preparation of Highly Concentrated-Setting Modifier-Containing Mixture (Set-1)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), tartaric acid (Ta-3), and ordinary Portland cement N as the inorganic powder were charged into a mixer at a ratio of 3:6:3:1:2:1:1:2:1:20 (=Na-1:Na-2:Na-3:Al-1:Al-2:Al-3:Ta-1:Ta-2:Ta-3:N) in terms of a mass ratio, and were dry-mixed. The obtained mixture was designated as a highly concentrated-setting modifier-containing mixture (Set-1).

[Preparation of Setting Modifier Mixture (Set-2)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), and tartaric acid (Ta-3) were charged into a mixer at a ratio of 3:6:3:1:2:1:1:2:1 (=Na-1:Na-2:Na-3:Al-1:Al-2:Al-3:Ta-1:Ta-2:Ta-3) in terms of a mass ratio, and were dry-mixed. The obtained mixture was designated as a setting modifier mixture (Set-2).

[Preparation of Highly Concentrated-Setting Modifier-Containing Mixture (Set-3)]

Sodium carbonate (Na-1), sodium carbonate (Na-2), sodium carbonate (Na-3), sodium aluminate (Al-1), sodium aluminate (Al-2), sodium aluminate (Al-3), tartaric acid (Ta-1), tartaric acid (Ta-2), tartaric acid (Ta-3), sodium sulfate (NS-3), and ordinary Portland cement (N) as the inorganic powder were charged into a mixer at a ratio of 3:6:3:1:2:1:1:2:1:12:32 (Na-1:Na-2:Na-3:Al-1:Al-2:Al-3:Ta-1:Ta-2:Ta-3:NS-3:N) in terms of a mass ratio, and were dry-mixed. The obtained mixture was designated as a highly concentrated-setting modifier-containing mixture (Set-3).

Examples 1 and 2, and Comparative Example 1

The rapid-hardening admixture (SA-1, SA-2, SA-3), ordinary Portland cement (N), the highly concentrated-setting modifier-containing mixture (Set-1, Set-3), the setting modifier mixture (Set-2), the fine aggregate (S3-6), the water-reducing material (MX) and the defoaming agent (14HP) were charged into a mixer at proportions (parts by mass) shown in Table 2, and were dry-mixed to produce a rapid-hardening mortar composition (rapid-hardening patching repair material for a filling method).

TABLE 2

| | Rapid-hardening admixture | | | | | | | | | |
|---|---|---|---|---|---|---|---|---|---|---|
| | SA-1 | SA-2 | SA-3 | N | Set-1 | Set-2 | Set-3 | S3-6 | MX | 14HP |
| Example 1 | 100 | — | — | 200 | 8 | — | — | 500 | 0.8 | 1.2 |
| Comparative Example 1 | — | 100 | — | 200 | — | 4 | — | 500 | 0.8 | 1.2 |
| Example 2 | — | — | 100 | 200 | — | — | 8 | 500 | 0.8 | 1.2 |

Unit: Parts by mass 15 parts by mass of water was added to 100 parts by mass of each of the obtained rapid-hardening mortar compositions, and the mixture was kneaded for 2 minutes with a forced-kneading concrete mixer to prepare mortar. Using the prepared mortars, the respective physical properties of a JIS flow value without dropping motion, setting time, and compression strength were measured.

For the JIS flow value without dropping motion, in accordance with JIS R 5201 "Physical Test Method for Cement", a flow value was measured without a dropping motion by table flow.

The setting initial time was measured in accordance with JIS R 5201 "Physical Test Method for Cement".

The compression strength was measured in accordance with JIS R 5201 "Physical Test Method for Cement".

In order to check temperature characteristics of the rapid-hardening mortar composition, the respective physical properties of the JIS flow value without dropping motion, the setting time, and the compression strength were measured at environmental temperatures of 5° C., 20° C., and 35° C. The results are shown in Table 3.

Further, in order to check storage characteristics of the rapid-hardening mortar composition, the rapid-hardening mortar composition was packed in plastic bags (capacity: 12 L), and pinholes (pore diameter: 0.5 mm) were opened at four corners of the plastic bag. The plastic bags were stored in a room at a temperature of 30° C. and a humidity of 80% RH, and one of the plastic bags was stored for 3 months and the other was stored for 6 months. With respect to the rapid-hardening mortar compositions after storage, mortars were prepared, and the respective physical properties of the JIS flow value without dropping motion, the setting time, and the compression strength were measured. The respective physical properties at this time were measured at an environmental temperature of 20° C. The results are shown in Table 4.

In particular, it was confirmed that the rapid-hardening mortar composition of Example 2 containing sodium sulfate had a large JIS flow value without dropping motion and excellent fluidity.

Further, from the results shown in Table 4, it was confirmed that the rapid-hardening mortar compositions of Examples 1 and 2 had small variations in the JIS flow value without dropping motion, the setting time, and the compression strength due to storage as compared with the rapid-hardening mortar composition of Comparative Example 1, and thus were excellent in storage stability.

TABLE 3

| | Environmental temperature (° C.) | JIS flow value without dropping motion (mm) | Setting time (min) | | Compression strength (N/mm$^2$) | | | |
|---|---|---|---|---|---|---|---|---|
| | | | Initial | Finish | Age of 2 hours | Age of 3 hours | Age of 7 days | Age of 28 days |
| Example 1 | 5 | 272 | 48 | 56 | 10.5 | 28.7 | 46.0 | 65.4 |
| | 20 | 283 | 51 | 56 | 12.8 | 30.3 | 48.5 | 68.6 |
| | 35 | 295 | 50 | 55 | 13.6 | 32.2 | 49.1 | 68.8 |
| Comparative Example 1 | 5 | 241 | 67 | 80 | 3.5 | 10.6 | 38.9 | 49.6 |
| | 20 | 295 | 52 | 65 | 9.6 | 22.4 | 40.3 | 51.3 |
| | 35 | 324 | 41 | 58 | 11.0 | 20.2 | 37.7 | 50.2 |
| Example 2 | 5 | 288 | 47 | 56 | 11.0 | 29.0 | 47.9 | 66.3 |
| | 20 | 302 | 49 | 53 | 13.3 | 33.2 | 48.9 | 68.8 |
| | 35 | 310 | 50 | 54 | 14.5 | 34.1 | 50.6 | 69.3 |

TABLE 4

| | Storage period (month) | JIS flow value without dropping motion (mm) | Setting time (min) | | Compression strength (N/mm$^2$) | | | |
|---|---|---|---|---|---|---|---|---|
| | | | Initial | Finish | Age of 2 hours | Age of 3 hours | Age of 7 days | Age of 28 days |
| Example 1 | Immediately after production | 283 | 51 | 56 | 12.8 | 30.3 | 48.5 | 68.6 |
| | 3 | 288 | 52 | 58 | 13.0 | 31.2 | 48.8 | 68.2 |
| | 6 | 290 | 52 | 56 | 12.7 | 31.0 | 48.5 | 68.5 |
| Comparative Example 1 | Immediately after production | 295 | 52 | 65 | 9.6 | 22.4 | 40.3 | 51.3 |
| | 3 | 221 | 77 | 105 | 0.6 | 3.6 | 32.3 | 48.0 |
| | 6 | 185 | 120 or more | 180 or more | Not available | Not available | 27.5 | 32.6 |
| Example 2 | Immediately after production | 302 | 49 | 53 | 13.3 | 33.2 | 48.9 | 68.8 |
| | 3 | 300 | 50 | 55 | 13.5 | 33.8 | 49.2 | 68.4 |
| | 6 | 304 | 50 | 54 | 13.2 | 33.5 | 49.0 | 68.9 |

From the results shown in Table 3, it was confirmed that the rapid-hardening mortar compositions of Examples 1 and 2 had small variations in the JIS flow value without dropping motion, the setting time, and the compression strength due to an environmental temperature as compared with the rapid-hardening mortar composition of Comparative Example 1, and thus were excellent in temperature stability.

Examples 3 and 4, and Comparative Example 2

The rapid-hardening admixture (SA-1, SA-2, SA-3), high early strength Portland cement (H), the highly concentrated-setting modifier-containing mixture (Set-1, Set-3), the setting modifier mixture (Set-2), the fine aggregate (S3-6), and the defoaming agent (14HP) were charged into a mixer at proportions (parts by mass) shown in Table 5, and were dry-mixed to produce a rapid-hardening mortar composition (rapid-hardening patching repair material for a spraying method).

TABLE 5

|  | Rapid-hardening admixture | | | H | Set-1 | Set-2 | Set-3 | S3-6 | 14HP |
|---|---|---|---|---|---|---|---|---|---|
|  | SA-1 | SA-2 | SA-3 | | | | | | |
| Example 3 | 100 | — | — | 350 | 14.5 | — | — | 650 | 1.5 |
| Comparative Example 2 | — | 100 | — | 350 | — | 7.3 | — | 650 | 1.5 |
| Example 4 | — | — | 100 | 350 | — | — | 14.5 | 650 | 1.5 |

Unit: Parts by mass 13 parts by mass of water was added to 100 parts by mass of each of the obtained rapid-hardening mortar compositions, and the mixture was kneaded for 2 minutes with a forced-kneading concrete mixer to prepare mortar. Using the prepared mortars, the respective physical properties of a flow value with 15 times dropped at JIS R 5201, setting time, and compression strength were measured.

For the flow value with 15 times dropped at JIS R 5201, in accordance with JIS R 5201 "Physical Test Method for Cement", a flow value was measured when a dropping motion by table flow was applied 15 times.

The setting time and the compression strength were measured by the methods described above. Test pieces for the compression strength test were manufactured by a spraying method.

In order to check temperature characteristics of the rapid-hardening mortar composition, the respective physical properties of the flow value with 15 times dropped at JIS R 5201, the setting time, and the compression strength were measured at environmental temperatures of 5° C., 20° C., and 35° C. The results are shown in Table 6.

Further, in order to check storage characteristics of the rapid-hardening mortar composition, the rapid-hardening mortar compositions were stored in a room at a temperature of 30° C. and a humidity of 80% RH for 3 months and 6 months, respectively in the same manner as in Example 1. With respect to the rapid-hardening mortar compositions after storage, mortars were prepared, and the respective physical properties of the flow value with 15 times dropped at JIS R 5201, the setting time, and the compression strength were measured. The respective physical properties at this time were measured at an environmental temperature of 20° C. The results are shown in Table 7.

TABLE 6

|  | Environmental temperature (° C.) | Flow value with 15 times dropped at JIS R 5201 (mm) | Setting time (min) | | Compression strength (N/mm$^2$) | | |
|---|---|---|---|---|---|---|---|
|  |  |  | Initial | Finish | Age of 3 hours | Age of 7 days | Age of 28 days |
| Example 3 | 5 | 170 | 70 | 80 | 20.6 | 32.3 | 58.4 |
|  | 20 | 178 | 68 | 76 | 23.2 | 36.0 | 59.8 |
|  | 35 | 180 | 62 | 69 | 23.0 | 36.3 | 60.1 |
| Comparative Example 2 | 5 | 125 | 95 | 110 | 10.4 | 24.4 | 48.9 |
|  | 20 | 172 | 70 | 88 | 16.7 | 25.3 | 53.1 |
|  | 35 | 196 | 42 | 62 | 17.7 | 26.8 | 52.6 |
| Example 4 | 5 | 183 | 69 | 78 | 21.9 | 33.9 | 59.7 |
|  | 20 | 188 | 66 | 74 | 24.2 | 37.6 | 61.5 |
|  | 35 | 192 | 61 | 69 | 23.4 | 37.9 | 61.4 |

TABLE 7

|  | Storage period (month) | Flow value with 15 times dropped at JIS R 5201 (mm) | Setting time (min) | | Compression strength (N/mm$^2$) | | |
|---|---|---|---|---|---|---|---|
|  |  |  | Initial | Finish | Age of 3 hours | Age of 7 days | Age of 28 days |
| Example 3 | Immediately after production | 178 | 68 | 76 | 23.2 | 36.0 | 59.8 |
|  | 3 | 181 | 66 | 73 | 23.0 | 36.3 | 60.2 |
|  | 6 | 181 | 65 | 71 | 23.6 | 36.8 | 60.0 |

TABLE 7-continued

|  | Storage period (month) | Flow value with 15 times dropped at JIS R 5201 (mm) | Setting time (min) Initial | Setting time (min) Finish | Compression strength (N/mm$^2$) Age of 3 hours | Compression strength (N/mm$^2$) Age of 7 days | Compression strength (N/mm$^2$) Age of 28 days |
|---|---|---|---|---|---|---|---|
| Comparative Example 2 | Immediately after production | 172 | 70 | 88 | 16.7 | 25.3 | 53.1 |
|  | 3 | 125 | 93 | 125 | 8.4 | 21.1 | 51.4 |
|  | 6 | 100 | 120 or more | 180 or more | Not available | 19.5 | 46.3 |
| Example 4 | Immediately after production | 188 | 66 | 74 | 24.2 | 37.6 | 61.5 |
|  | 3 | 190 | 65 | 71 | 24.5 | 38.0 | 61.9 |
|  | 6 | 188 | 67 | 75 | 23.7 | 38.1 | 60.8 |

From the results shown in Table 6, it was confirmed that the rapid-hardening mortar compositions of Examples 3 and 4 had small variations in the flow value with 15 times dropped at JIS R 5201, the setting time, and the compression strength due to an environmental temperature as compared with the rapid-hardening mortar composition of Comparative Example 2, and thus were excellent in temperature stability. In particular, it was confirmed that the rapid-hardening mortar composition of Example 4 containing sodium sulfate had a large flow value with 15 times dropped at JIS R 5201 and excellent fluidity.

Further, from the results shown in Table 7, it was confirmed that the rapid-hardening mortar compositions of Examples 3 and 4 had small variations in the flow value with 15 times dropped at JIS R 5201, the setting time, and the compression strength due to storage as compared with the rapid-hardening mortar composition of Comparative Example 2, and thus were excellent in storage stability.

Examples 5 and 6, and Comparative Example 3

The rapid-hardening admixture (SA-1, SA-2, SA-3), high early strength Portland cement (H), the highly concentrated-setting modifier-containing mixture (Set-1, Set-3), the setting modifier mixture (Set-2), the fine aggregate (S3-6), the water-reducing material (MX), and the defoaming agent (14HP) were charged into a mixer at proportions (parts by mass) shown in Table 8, and were dry-mixed to produce a rapid-hardening mortar composition (rapid-hardening patching repair material for a prepacking method).

22 parts by mass of water was added to 100 parts by mass of each of the obtained rapid-hardening mortar compositions, and the mixture was kneaded for 2 minutes with a forced-kneading concrete mixer to prepare mortar. Using the prepared mortars, the physical properties of $J_{14}$ funnel flow time, setting time, and compression strength were measured.

The $J_{14}$ funnel flow time was measured in accordance with the standard of Japan Society of Civil Engineers, JSCE-F 541 "Fluidity Test Method of Filled Mortar".

The setting time and the compression strength were measured by the methods described above.

In order to check temperature characteristics of the rapid-hardening mortar composition, the respective physical properties of the $J_{14}$ funnel flow time, the setting time, and the compression strength were measured at environmental temperatures of 5° C., 20° C., and 35° C. The results are shown in Table 9.

Further, in order to check storage characteristics of the rapid-hardening mortar composition, the rapid-hardening mortar compositions were stored in a room at a temperature of 30° C. and a humidity of 80% RH for 3 months and 6 months, respectively in the same manner as in Example 1. With respect to the rapid-hardening mortar compositions after storage, mortars were prepared, and the respective physical properties of the $J_{14}$ funnel flow time, the setting time, and the compression strength were measured. The respective physical properties at this time were measured at an environmental temperature of 20° C. The results are shown in Table 10.

TABLE 8

|  | Rapid-hardening admixture | | | | | | | | | |
|---|---|---|---|---|---|---|---|---|---|---|
|  | SA-1 | SA-2 | SA-3 | H | Set-1 | Set-2 | Set-3 | S3-6 | MX | 14HP |
| Example 5 | 100 | — | — | 300 | 11.0 | — | — | 570 | 0.90 | 2.5 |
| Comparative Example 3 | — | 100 | — | 300 | — | 5.5 | — | 570 | 0.90 | 2.5 |
| Example 6 | — | — | 100 | 300 | — | — | 11.0 | 570 | 0.90 | 2.5 |

Unit: Parts by mass

TABLE 9

|  | Environmental temperature (° C.) | $J_{14}$ funnel flow time (sec) | Setting time (min) | | Compression strength (N/mm$^2$) | | |
|---|---|---|---|---|---|---|---|
|  |  |  | Initial | Finish | Age of 3 hours | Age of 7 days | Age of 28 days |
| Example 5 | 5 | 4.5 | 38 | 44 | 15.2 | 46.2 | 58.7 |
|  | 20 | 4.1 | 35 | 38 | 16.6 | 48.5 | 60.5 |
|  | 35 | 4.0 | 33 | 36 | 17.8 | 49.7 | 60.3 |
| Comparative Example 3 | 5 | 5.3 | 43 | 55 | 10.9 | 40.2 | 54.3 |
|  | 20 | 4.2 | 33 | 43 | 14.6 | 43.8 | 57.4 |
|  | 35 | 3.4 | 27 | 35 | 15.1 | 44.5 | 56.5 |
| Example 6 | 5 | 4.2 | 36 | 42 | 15.5 | 46.3 | 58.6 |
|  | 20 | 4.0 | 35 | 38 | 17.0 | 48.9 | 61.0 |
|  | 35 | 3.9 | 34 | 37 | 18.0 | 49.6 | 61.2 |

TABLE 10

|  | Storage period (month) | $J_{14}$ funnel flow time (sec) | Setting time (min) | | Compression strength (N/mm$^2$) | | |
|---|---|---|---|---|---|---|---|
|  |  |  | Initial | Finish | Age of 3 hours | Age of 7 days | Age of 28 days |
| Example 5 | Immediately after production | 4.1 | 35 | 38 | 16.6 | 48.5 | 60.5 |
|  | 3 | 4.2 | 36 | 40 | 16.9 | 49.2 | 60.9 |
|  | 6 | 4.4 | 36 | 41 | 16.7 | 49.3 | 61.3 |
| Comparative Example 3 | Immediately after production | 4.2 | 33 | 43 | 14.6 | 43.8 | 57.4 |
|  | 3 | 4.9 | 56 | 69 | 7.8 | 40.4 | 54.4 |
|  | 6 | 5.5 | 77 | 95 | 4.5 | 37.4 | 53.8 |
| Example 6 | Immediately after production | 4.0 | 35 | 38 | 17.0 | 48.9 | 61.0 |
|  | 3 | 4.1 | 36 | 39 | 17.3 | 49.6 | 61.8 |
|  | 6 | 4.2 | 37 | 40 | 17.1 | 49.5 | 62.0 |

From the results shown in Table 9, it was confirmed that the rapid-hardening mortar compositions of Examples 5 and 6 had small variations in the $J_{14}$ funnel flow time, the setting time, and the compression strength due to an environmental temperature as compared with the rapid-hardening mortar composition of Comparative Example 3, and thus were excellent in temperature stability. In particular, it was confirmed that the rapid-hardening mortar composition of Example 6 containing sodium sulfate had a short $J_{14}$ funnel flow time and excellent fluidity.

Further, from the results shown in Table 10, it was confirmed that the rapid-hardening mortar compositions of Examples 5 and 6 had small variations in the $J_{14}$ funnel flow time, the setting time, and the compression strength due to storage as compared with the rapid-hardening mortar composition of Comparative Example 3, and thus were excellent in storage stability.

Examples 7 to 11

PVA short fibers (fiber diameter: 26 μm, fiber length: 3 mm) as short fibers were added to the rapid-hardening mortar composition of Example 1 such that the amount of the short fibers with respect to the entire amount of the rapid-hardening mortar composition was 0.05% by mass (Example 7), 0.1% by mass (Example 8), 0.5% by mass (Example 9), 1.0% by mass (Example 10), or 3.0% by mass (Example 11), and mixed to prepare rapid-hardening mortar compositions of Examples 7 to 11 containing the short fibers.

15 parts by mass of water was added to 100 parts by mass of each of the obtained rapid-hardening mortar compositions containing the short fibers, and mortar was prepared in the same manner as in Example 1. For the obtained mortars, the JIS flow value without dropping motion was measured.

Further, for specimens manufactured using the obtained mortars, a repeated fatigue test of 2,000,000 times was performed. The fatigue test was carried out in accordance with the method based on the former JSTM C 7104: 1999 "Fatigue Test Method for Concrete by Repeated Compression Stress". A level of the fatigue test was set as a static compression strength of 50 N/mm², an upper limit stress ratio of 65%, a lower limit stress ratio of 10%, and a repetition rate of 10 Hz, and a dimension of the specimen was φ50×100 mm. The results are shown in Table 11.

TABLE 11

|  | Type of short fibers | Added amount of short fibers (% by mass) | JIS flow value without dropping motion (mm) | Condition of being destroyed in fatigue test |
|---|---|---|---|---|
| Example 7 | PVA fibers | 0.05 | 285 | Destroyed at 1,450,145 times |
| Example 8 |  | 0.1 | 283 | Good at 2,000,000 times |
| Example 9 |  | 0.5 | 280 | Good at 2,000,000 times |
| Example 10 |  | 1 | 275 | Good al 2,000,000 times |
| Example 11 |  | 3 | 252 | Good at 2,000,000 times |
| Example 1 | — | — | 283 | Destroyed at 34,132 times |

From the results shown in Table 11, it was confirmed that a compression fatigue durability of the specimen (hardened body) manufactured using the rapid-hardening mortar composition containing the PVA short fibers was greatly improved even in the case where the added amount of the short fibers was 0.05% by mass, and, in particular, the compression fatigue durability was remarkably improved in the case where the added amount of the short fibers was 0.1% by mass or more. Thus, it was confirmed that the specimen was in a good condition even in the case where the number of repetitions was 2,000,000 times.

Examples 12 to 17

A powdered emulsion (P) was added to the rapid-hardening mortar composition of Example 3 such that the amount of the powdered emulsion with respect to the entire amount of the rapid-hardening mortar composition was 0.5% by mass (Example 12), 1.0% by mass (Example 13), 2.0% by mass (Example 14), 5.0% by mass (Example 15), 10.0% by mass (Example 16), or 15.0% by mass (Example 17), and mixed to prepare rapid-hardening mortar compositions containing the powdered emulsion of Examples 12 to 17.

13 parts by mass of water was added to 100 parts by mass of each of the obtained rapid-hardening mortar compositions containing the powdered emulsion, and mortar was prepared in the same manner as in Example 3. With respect to the obtained mortars, the flow value with 15 times dropped at JIS R 5201 was measured.

Further, the obtained mortar was applied to a surface of a concrete flat plate, which had been subjected to roughening treatment by water jet, in a dry blowing method. The applied mortar was sealed and cured until age of 28 days. Compression strength of hardened body of the obtained mortar and adhesion strength between the hardened body and the concrete flat plate were measured. The results are shown in Table 12. The compression strength was measured by the above-mentioned method, and the adhesion strength was measured using a Kenken-type adhesion properties test machine.

TABLE 12

|  | Added amount of P (% by mass) | Flow value with 15 times dropped at JIS R 5201 (sec) | Compression strength (Age of 28 days) (N/mm²) | Adhesion strength (Age of 28 days) (N/mm²) |
|---|---|---|---|---|
| Example 12 | 0.5 | 180 | 60.9 | 1.46 |
| Example 13 | 1.0 | 184 | 63.2 | 1.67 |
| Example 14 | 2.0 | 180 | 61.2 | 1.76 |
| Example 15 | 5.0 | 177 | 57.5 | 1.9 |
| Example 16 | 10.0 | 160 | 55.4 | 1.88 |
| Example 17 | 15.0 | 152 | 50.2 | 1.83 |
| Example 3 | No addition | 178 | 59.8 | 0.52 |

From the results shown in Table 12, it was confirmed that the hardened body manufactured using the rapid-hardening mortar composition containing the powdered emulsion had improved adhesion strength to the concrete flat plate, and, in particular, the hardened body manufactured using the rapid-hardening mortar composition containing 1.0% by mass or more of the powdered emulsion had an adhesion strength of 1.5 N/mm² or more to the concrete flat plate.

Examples 18 to 21

Silica fume (SE) was added to the rapid-hardening mortar composition of Example 5 such that the amount of the silica fume with respect to the entire amount of the rapid-hardening mortar composition was 1.0% by mass (Example 18), 5.0% by mass (Example 19), 10.0% by mass (Example 20), or 15.0% by mass (Example 21), and mixed to prepare rapid-hardening mortar compositions of Examples 18 to 21 containing the silica fume.

22 parts by mass of water was added to 100 parts by mass of each of the obtained rapid-hardening mortar compositions containing the silica fume, and mortar was prepared in the same manner as in Example 5. The obtained mortar was poured into a mold of 100×100×400 mm to prepare a test piece. A carbonation depth, a chloride ion diffusion coefficient and a total amount of pores of the manufactured test piece were measured by the following methods. The results are shown in Table 13.

(Method for Measuring Carbonation Depth)

In accordance with JIS A 1153 "Method for Accelerating Carbonation of Concrete", the measurement was performed by carrying out an accelerated test of 5% $CO_2$ concentration.

(Method for Measuring Chloride Ion Diffusion Coefficient)

The measurement was performed in accordance with the standard of Japan Society of Civil Engineers, JSCE-G 572 "Test Method for Apparent Diffusion Coefficient of Chloride Ions in Concrete by Dipping".

(Method for Measuring Total Amounts of Pores)

The measurement was performed by a mercury intrusion porosimeter.

TABLE 13

| | Added amount of SF (% by mass) | Carbonation depth (mm) 3 months | Carbonation depth (mm) 6 months | Chloride ion diffusion coefficient (cm²/year) | Total amount of pores (mm³/g) |
|---|---|---|---|---|---|
| Example 18 | 1.0 | 5.0 | 7.5 | 1.13 | 87.5 |
| Example 19 | 5.0 | 3.5 | 5.5 | 0.97 | 67.7 |
| Example 20 | 10.0 | 3.5 | 5.0 | 0.87 | 65.8 |
| Example 21 | 15.0 | 4.5 | 6.0 | 0.90 | 68.2 |
| Example 5 | 0 | 8.0 | 11.5 | 1.85 | 135.0 |

From the results shown in Table 13, it was confirmed that test piece (hardened body) manufactured using the rapid-hardening mortar composition containing the silica fume had a decreased total amount of pores, and thus progress of carbonation and progress of diffusion of chloride ions were suppressed.

Examples 22 and 23

A synthetic polymer-based thickening water-retention agent (Ad) was added to the rapid-hardening mortar composition of Example 1 such that the amount of the synthetic polymer-based thickening water-retention agent with respect to the entire amount of the rapid-hardening patching repair material was 0.1% by mass (Example 22) or 0.3% by mass % (Example 23), and mixed to prepare rapid-hardening mortar compositions of Examples 22 and 23 containing the thickening water-retention agent.

15 parts by mass of water was added to 100 parts by mass of each of the obtained rapid-hardening mortar compositions containing the synthetic polymer-based thickening water-retention agent, and mortar was prepared in the same manner as in Example 1. Using the obtained mortars, a freeze-thaw test was carried out. The test was carried out up to 300 cycles in accordance with JIS A 1145 "Freeze-thaw Test Method for Concrete", and a relative dynamic modulus of elasticity was measured. The results are shown in FIG. 3.

From the results shown in FIG. 3, it was confirmed that the concrete manufactured using the rapid-hardening mortar composition containing the synthetic polymer-based thickening water-retention agent had remarkably improved freeze-thaw resistance even in the case where the amount of the thickening water-retention agent added was 0.1% by mass to 0.3% by mass which was small, and a relative dynamic modulus of elasticity of 80% or more was maintained even after repeated 300 freeze-thaw cycles.

Examples 24 and 25, and Comparative Example 4

The rapid-hardening admixture (SA-1, SA-2, SA-3), ordinary Portland cement (N), the highly concentrated-setting modifier-containing mixture (Set-1, Set-3), the setting modifier mixture (Set-2), the fine aggregate (S), the powdered emulsion (P), and the defoaming agent (14HP) were charged into a mixer at proportions (parts by mass) shown in Table 14, and were dry-mixed to produce a rapid-hardening mortar composition.

TABLE 14

| | Rapid-hardening admixture | | | | | | | | | |
|---|---|---|---|---|---|---|---|---|---|---|
| | SA-1 | SA-2 | SA-3 | N | Set-1 | Set-2 | Set-3 | S | P | 14HP |
| Example 24 | 100 | — | — | 500 | 8 | — | — | 100 | 14 | 3 |
| Comparative Example 4 | — | 100 | — | 500 | — | 4 | — | 100 | 14 | 3 |
| Example 25 | — | — | 100 | 500 | — | — | 8 | 100 | 14 | 3 |

Unit: Parts by mass 50 parts by mass of water was added to 100 parts by mass of each of the obtained rapid-hardening mortar compositions, and the mixture was kneaded for 2 minutes with a hand mixer to prepare cement milk. Using the prepared cement milks, the respective physical properties of P funnel flow time, setting time, and compression strength were measured. The P funnel flow time was measured as follows. The setting time and the compression strength were measured by the methods described above.

The P funnel flow time was measured in accordance with the standard of Japan Society of Civil Engineers, JSCE-F 521 "Method of Fluidity Test of Injection Mortar for Prepacked Concrete (Method by P funnel)".

In order to check temperature characteristics of the rapid-hardening mortar compositions, the respective physical properties of the P funnel flow time, the setting time, and the compression strength were measured at environmental temperatures of 5° C., 20° C., and 35° C. The results are shown in Table 15.

Further, in order to check storage characteristics of the rapid-hardening mortar compositions, the rapid-hardening mortar compositions were stored in a room at a temperature of 30° C. and a humidity of 80% RH for 3 months and 6 months, respectively in the same manner as in Example 1. With respect to the rapid-hardening mortar compositions after storage, cement milks were prepared, and the respective physical properties of the P funnel flow time, the setting time, and the compression strength were measured. The respective physical properties at this time were measured at an environmental temperature of 20° C. The results are shown in Table 16.

TABLE 15

|  | Environmental temperature (° C.) | P funnel flow time (sec) | Setting time (min) | | Compression strength (N/mm$^2$) | | |
|---|---|---|---|---|---|---|---|
|  |  |  | Initial | Finish | Age of 2 hours | Age of 3 hours | Age of 7 days |
| Example 24 | 5 | 11.3 | 48 | 59 | 4.5 | 7.8 | 25.8 |
|  | 20 | 10.9 | 46 | 54 | 4.8 | 8.1 | 26.3 |
|  | 35 | 10.6 | 45 | 51 | 5.1 | 8.3 | 27.8 |
| Comparative Example 4 | 5 | 12.1 | 63 | 80 | 1.0 | 4.5 | 24.2 |
|  | 20 | 10.8 | 45 | 60 | 3.6 | 5.2 | 25.5 |
|  | 35 | 9.6 | 36 | 52 | 4.2 | 6.7 | 25.8 |
| Example 25 | 5 | 10.5 | 47 | 56 | 5.0 | 8.4 | 26.0 |
|  | 20 | 9.8 | 47 | 52 | 5.4 | 8.6 | 26.8 |
|  | 35 | 9.6 | 45 | 49 | 5.4 | 9.0 | 27.4 |

TABLE 16

|  | Storage period (month) | P funnel flow time (sec) | Setting time (min) | | Compression strength (N/mm$^2$) | | |
|---|---|---|---|---|---|---|---|
|  |  |  | Initial | Finish | Age of 2 hours | Age of 3 hours | Age of 7 days |
| Example 24 | Immediately after production | 10.9 | 46 | 54 | 4.8 | 8.1 | 26.3 |
|  | 3 | 10.7 | 48 | 56 | 4.8 | 8.0 | 26.5 |
|  | 6 | 10.9 | 48 | 57 | 4.7 | 8.3 | 27.0 |
| Comparative Example 4 | Immediately after production | 10.8 | 45 | 60 | 3.6 | 5.2 | 25.5 |
|  | 3 | 12.7 | 81 | 115 | Not available | 1.4 | 23.1 |
|  | 6 | 13.4 | 120 or more | 180 or more | Not available | Not available | 12.2 |
| Example 25 | Immediately after production | 9.8 | 47 | 52 | 5.4 | 8.6 | 26.8 |
|  | 3 | 9.6 | 48 | 53 | 5.3 | 8.8 | 27.4 |
|  | 6 | 9.6 | 48 | 53 | 5.5 | 8.5 | 28.0 |

From the results shown in Table 15, it was confirmed that the rapid-hardening mortar compositions of Examples 24 and 25 had small variations in the P funnel flow time, the setting time, and the compression strength due to an environmental temperature as compared with the rapid-hardening mortar composition of Comparative Example 4, and thus were excellent in temperature stability. In particular, it was confirmed that the rapid-hardening mortar composition of Example 25 containing sodium sulfate had a short P funnel flow time and excellent fluidity.

Further, from the results shown in Table 16, it was confirmed that the rapid-hardening mortar compositions of Examples 24 and 25 had small variations in the P funnel flow time, the setting time, and the compression strength due to storage as compared with the rapid-hardening mortar composition of Comparative Example 4, and thus were excellent in storage stability.

Examples 26 to 31

The powdered emulsion (P) was added to the rapid-hardening mortar composition of Example 24 such that the amount of the powdered emulsion with respect to the entire amount of the rapid-hardening mortar composition was 0.5% by mass (Example 26), 1.0% by mass (Example 27), 2.0% by mass (Example 28), 5.0% by mass (Example 29), 10.0% by mass (Example 30), or 30.0% by mass (Example 31), and mixed to produce rapid-hardening mortar compositions containing the powdered emulsion.

45 parts by mass of water was added to 100 parts by mass of each of the obtained rapid-hardening mortar compositions containing the powdered emulsion, and the mixture was kneaded for 2 minutes with a hand mixer to prepare cement milk. Using the prepared cement milks, the P funnel flow time, and compression strength at age of 7 days were measured. The results are shown in Table 17.

Further, each of the prepared cement milks was injected into an open-graded asphalt mixture (100×200×thickness of 100 mm) having a porosity of 22% and curing was carried out at a temperature of 20° C. for 7 days to manufacture a semi-flexible pavement body. The obtained semi-flexible pavement body was immersed in water. A freeze-thaw cycle of −20° C.×6 hours and +20° C.×6 hours was repeated for 200 cycles, and an appearance of the pavement body was observed. The results are shown in Table 17.

TABLE 17

| | Added amount of P (% by mass) | P funnel flow time (sec) | Compression strength at age of 7 days (N/mm$^2$) | Condition of appearance due to freeze-thaw cycles | | | |
|---|---|---|---|---|---|---|---|
| | | | | 50 cycles | 100 cycles | 150 cycles | 200 cycles |
| Example 26 | 0.5 | 10.7 | 26.6 | Good | Good | Good | Scrape-off of injection material occurred |
| Example 27 | 1.0 | 10.9 | 25.8 | Good | Good | Good | Scrape-off of injection material occurred |
| Example 28 | 2.0 | 10.9 | 26.3 | Good | Good | Good | Good |
| Example 29 | 5.0 | 11.4 | 25.2 | Good | Good | Good | Good |
| Example 30 | 10.0 | 11.8 | 24.4 | Good | Good | Good | Good |
| Example 31 | 30.0 | 13.8 | 23.1 | Good | Good | Good | Good |
| Example 24 | — | 10.8 | 26 | Good | Scrape-off of injection material occurred | Scrape-off of injection material progressed | — |

From the results shown in Table 17, it was confirmed that a phenomenon in which a hardened body was scraped off due to repeated freezing-thawing was observed in a test piece in which the added amount of the powdered emulsion was less than 0.5% by mass. On the other hand, it was confirmed that in the case where the added amount of the powdered emulsion was 2.0% by mass or more, serape-off of a hardened body was not observed, and the hardened body had improved freeze-thaw resistance due to addition of the powdered emulsion.

Examples 32 to 36

An anti-freezing agent (CN) was added to the rapid-hardening mortar composition of Example 24 such that the amount of the anti-freezing agent with respect to the entire amount of the rapid-hardening mortar composition was 1.0% by mass (Example 32), 2.0% by mass (Example 33), 3.0% by mass (Example 34), 5.0% by mass (Example 35), or 10.0% by mass (Example 36), and mixed to produce rapid-hardening mortar compositions containing the anti-freezing agent.

45 parts by mass of water at a temperature of 5° C. was added to 100 parts by mass of each of the obtained rapid-hardening mortar compositions containing the anti-freezing agent, and the mixture was kneaded for 2 minutes with a hand mixer under an environment of −5° C. to prepare grout.

Each of the obtained grouts was injected into three cylindrical containers (inner diameter of ϕ50×height of 100 mm), respectively. These three cylindrical containers were placed in an insulating container made of foamed styrol and having an inside dimension of 200 mm×150×150 mm, and the grout was cured under an environment of −5° C. for 3 hours to manufacture a hardened body. The compression strength of each of the three hardened bodies of age of 3 hours was measured, and an average thereof was obtained. The results are shown in Table 18.

TABLE 18

|  | Added amount of CN (% by mass) | Temperature (° C.) | | | Temperature of mixed mortar (grout) | Compression strength at age of 3 hours (N/mm²) |
| --- | --- | --- | --- | --- | --- | --- |
|  |  | External air temperature | Material temperature | Water temperature |  |  |
| Example 32 | 1.0 | −5 | −3.2 | 5.1 | 0.7 | 2.3 |
| Example 33 | 2.0 | −5 | −3.6 | 5.3 | 0.6 | 3.8 |
| Example 34 | 3.0 | −5 | −3.3 | 5.2 | 0.6 | 4.8 |
| Example 35 | 5.0 | −5 | −3.5 | 4.9 | 0.7 | 5.4 |
| Example 36 | 10.0 | −5 | −3.8 | 5.2 | 0.5 | 5 |
| Example 24 | — | −5 | −3.5 | 5.1 | 0.6 | Not measurable |

From the results shown in Table 18, it was confirmed that a hardened body could be generated from the rapid-hardening mortar composition including the anti-freezing agent even under an environment of −5° C.

INDUSTRIAL APPLICABILITY

In the rapid-hardening mortar composition of the present embodiment, variations in setting initial time due to an environmental temperature are small, and variations in setting initial time are small even after a long-term storage. In addition, fluidity is high during a period from addition of water until hardening reaction proceeds, and properties of early age strength are excellent. Therefore, the rapid-hardening mortar composition of the present embodiment is suitably applied as a patching repair material used in a patching repair method, and an injection grout for pavement which is a raw material for a back-filling grout material used for PC pavement and RC pavement, cement milk used for semi-flexible pavement, and the like.

The invention claimed is:

1. A rapid-hardening mortar composition, comprising:
a rapid-hardening admixture;
cement; and
a fine aggregate,
wherein the cement is present in an amount of 100 parts by mass to 2,000 parts by mass with respect to 100 parts by mass of the rapid-hardening admixture,
wherein the rapid-hardening admixture is a composition that comprises:
calcium aluminate;
inorganic sulfate in an amount of 50 parts by mass to 200 parts by mass with respect to 100 parts by mass of the calcium aluminate; and
a setting modifier in an amount of 0.1 parts by mass to 10 parts by mass with respect to 100 parts by mass of the calcium aluminate,
wherein the setting modifier is at least one selected from the group consisting of an inorganic carbonate, an oxycarboxylic acid, sodium aluminate, and sodium sulfate,
wherein the inorganic sulfate is anhydrite,
wherein an average particle diameter of the calcium aluminate is in a range of 8 μm to 100 μm, and
wherein an average particle diameter of the setting modifier is in a range of 5 μm or less.

2. The composition of claim 1, wherein the fine aggregate is present in an amount of 200 parts by mass to 1,000 parts by mass with respect to 100 parts by mass of the rapid-hardening admixture.

3. The composition of claim 2, which is a patching repair material.

4. The composition of claim 1, wherein the fine aggregate is present in an amount of 10% by mass to 67% by mass with respect to an entire amount of the rapid-hardening mortar composition.

5. The composition of claim 4, which is an injection grout for pavement.

6. The composition of claim 1, wherein the setting modifier is present so that an amount of the setting modifier with respect to an entire amount of the rapid-hardening mortar composition is in a range of from 0.01% by mass to 5% by mass.

7. The composition of claim 1, further comprising:
short fibers that consist of one or more of organic short fibers and carbon short fibers in an amount of 0.1% by mass to 0.3% by mass with respect to an entire amount of the rapid-hardening mortar composition.

8. The composition of claim 1, further comprising:
a powdered emulsion in an amount of from 0.5% by mass to 30% by mass, with respect to an entire amount of the rapid-hardening mortar composition.

9. The composition of claim 1, further comprising:
silica fume in an amount of 1% by mass to 15% by mass with respect to an entire amount of the rapid-hardening mortar composition.

10. The composition of claim 1, further comprising:
a synthetic polymer-based thickening water-retention agent in an amount of from 0.1% by mass to 0.3% by mass, with respect to an entire amount of the rapid-hardening mortar composition.

11. The composition of claim 1, further comprising:
an anti-freezing agent that consists of one or more of sodium acetate, calcium acetate, and calcium nitrite in an amount of 1% by mass to 10% by mass with respect to an entire amount of the rapid-hardening mortar composition.

12. The composition of claim 1, wherein the setting modifier comprises an inorganic carbonate.

13. The composition of claim 1, wherein the setting modifier comprises an oxycarboxylic acid.

14. The composition of claim 1, wherein the setting modifier comprises sodium aluminate.

15. The composition of claim 1, wherein the setting modifier comprises sodium sulfate.

16. The composition of claim 1, further comprising:
organic fibers in a range of from 0.1 to 0.3% by mass, with respect to an entire amount of the rapid-hardening mortar composition.

17. The composition of claim 1, further comprising:
carbon fibers in a range of from 0.1 to 0.3% by mass, with respect to an entire amount of the rapid-hardening mortar composition.

18. The composition of claim 1, further comprising:
organic fibers and carbon fibers in a range of from 0.1 to 0.3% by mass, with respect to an entire amount of the rapid-hardening mortar composition.

19. A rapid-hardening mortar composition, comprising:
a rapid-hardening admixture;
cement; and
a fine aggregate,
wherein the cement is present in an amount of 100 parts by mass to 2,000 parts by mass with respect to 100 parts by mass of the rapid-hardening admixture,
wherein the rapid-hardening admixture is a composition that comprises:
calcium aluminate;
anhydrite in an amount of 50 parts by mass to 200 parts by mass with respect to 100 parts by mass of the calcium aluminate; and
a setting modifier in an amount of 0.1 parts by mass to 10 parts by mass with respect to 100 parts by mass of the calcium aluminate,
wherein the fine aggregate is present in an amount of 200 parts by mass to 1,000 parts by mass with respect to 100 parts by mass of the rapid-hardening admixture,
wherein an average particle diameter of the calcium aluminate is in a range of 8 μm to 100 μm, and
wherein an average particle diameter of the setting modifier is in a range of 5 μm or less.

20. A rapid-hardening mortar composition, comprising:
a rapid-hardening admixture;
cement; and
a fine aggregate,
wherein the cement is present in an amount of 100 parts by mass to 2,000 parts by mass with respect to 100 parts by mass of the rapid-hardening admixture,
wherein the rapid-hardening admixture is a composition that comprises:
silica fume in an amount of from 1 to 15% by mass, with respect to an entire amount of the rapid-hardening mortar composition;
calcium aluminate;
anhydrite in an amount of 50 parts by mass to 200 parts by mass with respect to 100 parts by mass of the calcium aluminate; and
a setting modifier in an amount of 0.1 parts by mass to 10 parts by mass with respect to 100 parts by mass of the calcium aluminate,
wherein an average particle diameter of the calcium aluminate is in a range of 8 μm to 100 μm, and
wherein an average particle diameter of the setting modifier is in a range of 5 μm or less.

* * * * *